US012559178B2

(12) United States Patent
Han et al.

(10) Patent No.: US 12,559,178 B2
(45) Date of Patent: Feb. 24, 2026

(54) VEHICLE BODY STRUCTURE

(71) Applicants:Hyundai Motor Company, Seoul
(KR); Kia Corporation, Seoul (KR)

(72) Inventors: Seung Woo Han, Hwaseong-si (KR);
Ju Tae Kim, Hwaseong-si (KR); **Sung
Gae Wee**, Seongnam-si (KR)

(73) Assignees: HYUNDAI MOTOR COMPANY,
Seoul (KR); KIA CORPORATION,
Seoul (KR)

( * ) Notice: Subject to any disclaimer, the term of this
patent is extended or adjusted under 35
U.S.C. 154(b) by 376 days.

(21) Appl. No.: 18/325,357

(22) Filed: May 30, 2023

(65) Prior Publication Data

US 2024/0140531 A1 May 2, 2024

(30) Foreign Application Priority Data

Oct. 28, 2022 (KR) ......................... 10-2022-0141588

(51) Int. Cl.
| | |
|---|---|
| B62D 21/15 | (2006.01) |
| B62D 21/03 | (2006.01) |
| B62D 25/02 | (2006.01) |
| B62D 25/20 | (2006.01) |
| B62D 27/02 | (2006.01) |
| B60N 2/005 | (2006.01) |

(52) U.S. Cl.
CPC ........... B62D 21/157 (2013.01); B62D 21/03
(2013.01); B62D 25/025 (2013.01); B62D
25/20 (2013.01); B62D 27/023 (2013.01);
B60N 2/005 (2013.01)

(58) Field of Classification Search
CPC .. B62D 25/025; B62D 25/2036; B62D 25/20;
B62D 25/00; B62D 21/157; B62D 21/03;
B62D 27/023
USPC ... 296/193.07, 29, 30, 23.01, 3, 209, 187.12
See application file for complete search history.

(56) References Cited

U.S. PATENT DOCUMENTS 7,195,306 B2 * 3/2007 Egawa ................... B62D 25/20
296/193.07
9,108,682 B2 * 8/2015 Mori .................. B62D 25/2036

FOREIGN PATENT DOCUMENTS

KR 102015-0019047 * 2/2015

OTHER PUBLICATIONS

KR102015-0019047 Text (Year: 2015).*

* cited by examiner

*Primary Examiner* — Dennis H Pedder
(74) *Attorney, Agent, or Firm* — SLATER MATSIL, LLP

(57) ABSTRACT

An embodiment vehicle body includes a front cross portion
having a substantially uniform cross-section throughout its
entire length, a rear cross portion spaced apart from the front
cross portion, the rear cross portion having a substantially
uniform cross-section throughout its entire length, and a
connection structure connecting the front cross portion and
the rear cross portion.

20 Claims, 22 Drawing Sheets

VEHICLE BODY STRUCTURE

CROSS-REFERENCE TO RELATED APPLICATIONS

This application claims the benefit of Korean Patent Application No. 10-2022-0141588, filed on Oct. 28, 2022, which application is hereby incorporated herein by reference.

TECHNICAL FIELD

The present disclosure relates to a vehicle body structure.

BACKGROUND

A vehicle may have a floor made of a steel material, and a plurality of associated components may be attached to the floor using fasteners, welding, and/or the like. The plurality of associated components may increase strength and stiffness of the floor and may be used to mount interior components such as vehicle seats on the floor. For example, the plurality of associated components may include a plurality of crossmembers, a plurality of longitudinal members, and a plurality of brackets. As the plurality of associated components are assembled to the floor using fasteners, welding, and/or the like, it may be difficult to simplify the assembly process, the layout of the interior components, and interior styling.

According to the related art, as the plurality of crossmembers, the plurality of longitudinal members, and the plurality of brackets are individually joined to the floor, the number of assembled components and joint portions and the overall weight thereof may increase, and the assembly process thereof may become complex.

Meanwhile, an electric vehicle may include a battery below the floor, and accordingly its weight may be greater than that of an existing internal combustion engine vehicle. The electric vehicle is required to reduce its weight in order to increase all electric range (AER) of the vehicle. In addition, in order to protect the battery and a passenger compartment stably, it is required to improve stiffness of the floor of the electric vehicle. When the plurality of associated components attached to the floor are made of an aluminum material, the weight reduction of the vehicle body may be achieved. However, since the aluminum material is expensive, the manufacturing cost of the vehicle body may relatively increase.

The above information described in this background section is provided to assist in understanding the background of the inventive concept, and may include any technical concept which is not considered as the prior art that is already known to those skilled in the art.

SUMMARY

The present disclosure relates to a vehicle body structure. Particular embodiments relate to a vehicle body structure designed to reduce the weight of a vehicle and improve stiffness of a vehicle body.

Embodiments of the present disclosure can solve problems occurring in the prior art while advantages achieved by the prior art are maintained intact.

An embodiment of the present disclosure provides a vehicle body structure designed to improve stiffness of a vehicle body and reduce the weight of a vehicle without the use of an expensive material such as aluminum.

According to an embodiment of the present disclosure, a vehicle body structure may include a structural component including a front cross portion, a rear cross portion spaced apart from the front cross portion, and a connection structure connecting the front cross portion and the rear cross portion. The front cross portion may have a substantially uniform cross-section throughout its entire length, and the rear cross portion may have a substantially uniform cross-section throughout its entire length.

The vehicle body structure may further include a pair of front reinforcements attached to the front cross portion and a pair of rear reinforcements attached to the rear cross portion.

The front cross portion may have a recessed wall extending along a longitudinal axis thereof, and each front reinforcement may be attached to the recessed wall of the front cross portion. The rear cross portion may have a recessed wall extending along a longitudinal axis thereof, and each rear reinforcement may be attached to the recessed wall of the rear cross portion.

The connection structure may include a central extension portion connecting a central portion of the front cross portion and a central portion of the rear cross portion and a pair of side extension portions located symmetrically with respect to the central extension portion.

Each side extension portion may include a front connection portion connected to the front cross portion, and a portion of each front reinforcement may be overlapped with the front connection portion of the side extension portion.

Each side extension portion may include a rear connection portion connected to the rear cross portion, and a portion of each rear reinforcement may be overlapped with the rear connection portion of the side extension portion.

The structural component may further include a pair of side flanges connected to both ends of the front cross portion, respectively, and a longitudinal axis of each side flange may be perpendicular to a longitudinal axis of the front cross portion.

The structural component may further include a pair of side flanges connected to both ends of the rear cross portion, respectively, and a longitudinal axis of each side flange may be perpendicular to a longitudinal axis of the rear cross portion.

The vehicle body structure may further include a pair of front outer seat brackets mounted on both end portions of the front cross portion, respectively, and a pair of rear outer seat brackets mounted on both end portions of the rear cross portion, respectively.

The structural component may further include a pair of edge extension portions connecting both ends of the front cross portion and both ends of the rear cross portion, respectively, and a longitudinal axis of each edge extension portion may be perpendicular to a longitudinal axis of the front cross portion and a longitudinal axis of the rear cross portion.

According to another embodiment of the present disclosure, a vehicle body structure may include a floor having a pair of flanges opposing each other, a pair of side sill inners joined to the pair of flanges, respectively, and a structural component joined to the floor and the pair of side sill inners. The structural component may include a front cross portion, a rear cross portion spaced apart from the front cross portion, and a central extension portion and a pair of side extension portions connecting the front cross portion and the rear cross portion. The pair of side extension portions may be located symmetrically with respect to the central extension portion. The front cross portion may have a substantially uniform cross-section throughout its entire length, and the rear cross portion may have a substantially uniform cross-section throughout its entire length.

The vehicle body structure may further include a pair of front reinforcements attached to the front cross portion and a pair of rear reinforcements attached to the rear cross portion.

The front cross portion may have a recessed wall extending along a longitudinal axis thereof, and each front reinforcement may be attached to the recessed wall of the front cross portion and the floor. The rear cross portion may have a recessed wall extending along a longitudinal axis thereof, and each rear reinforcement may be attached to the recessed wall of the rear cross portion and the floor.

The structural component may further include a pair of side flanges connected to both ends of the front cross portion, respectively, and each side flange may be joined to a corresponding side sill inner. The structural component may include a pair of front cut-out portions provided at both ends of the front cross portion, respectively, and each front cut-out portion may be defined by a corresponding end of the front cross portion and a corresponding side flange.

The vehicle body structure may further include a pair of front outer seat brackets covering the pair of front cut-out portions, respectively.

An outboard-side portion of each front outer seat bracket may be joined to the side flange and a top wall of the side sill inner, and an inboard-side portion of the front outer seat bracket may be joined to the end portion of the front cross portion.

The structural component may further include a pair of side flanges connected to both ends of the rear cross portion, respectively, and each side flange may be joined to a corresponding side sill inner. The structural component may include a pair of rear cut-out portions provided at both ends of the rear cross portion, respectively, and each rear cut-out portion may be defined by a corresponding end of the rear cross portion and a corresponding side flange.

The vehicle body structure may further include a pair of rear outer seat brackets covering the pair of rear cut-out portions, respectively.

A first section of an outboard-side portion of each rear outer seat bracket may be joined to the side flange and a top wall of the side sill inner, a second section of the outboard-side portion of the rear outer seat bracket may be joined to an inboard side wall of the side sill inner and a corresponding flange of the floor, a first section of an inboard-side portion of the rear outer seat bracket may be joined to the floor, and a second section of the inboard-side portion of the rear outer seat bracket may be joined to the end portion of the rear cross portion.

The structural component may further include a pair of edge extension portions connecting both ends of the front cross portion and both ends of the rear cross portion, respectively. Each edge extension portion may be overlapped and joined to a corresponding side sill inner and a corresponding flange of the floor.

BRIEF DESCRIPTION OF THE DRAWINGS

The above and other objects, features, and advantages of embodiments of the present disclosure will be more apparent from the following detailed description taken in conjunction with the accompanying drawings, in which.

DETAILED DESCRIPTION OF ILLUSTRATIVE EMBODIMENTS

Figure 1:
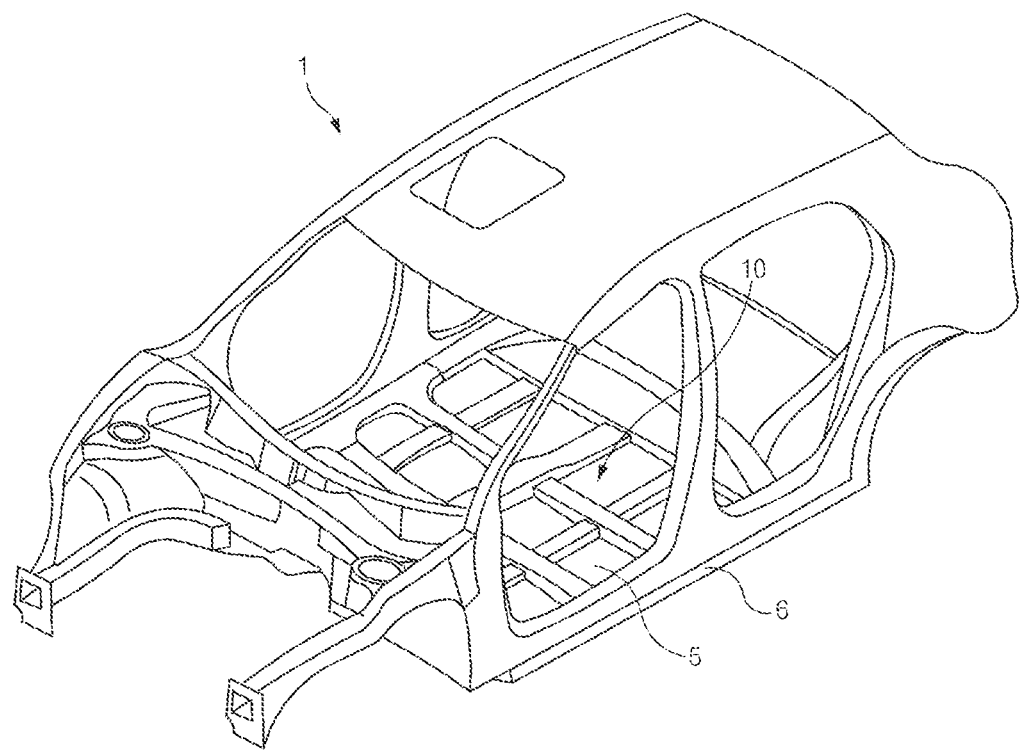
FIG. 1 illustrates a vehicle including a vehicle body structure according to an exemplary embodiment of the present disclosure.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with embodiments of the present disclosure will be omitted in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Throughout the specification, the term "inboard side" refers to a direction toward an interior space of a vehicle, and the term "outboard side" refers to a direction toward an exterior space of the vehicle.

Figure 2:
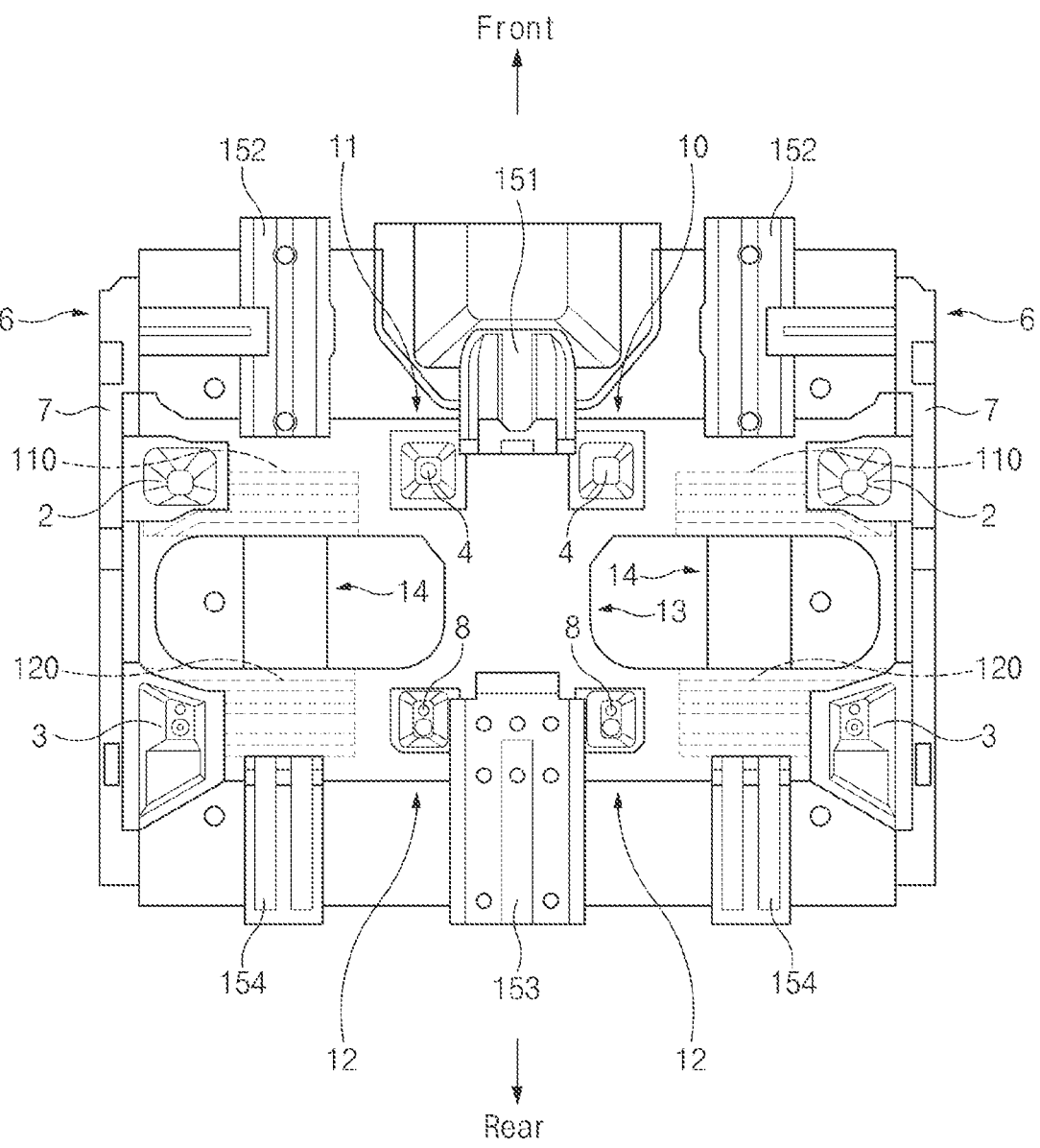
FIG. 2 illustrates a plan view of a vehicle body structure according to an exemplary embodiment of the present disclosure.

Referring to FIGS. 1 and 2, a vehicle body structure 1 according to an exemplary embodiment of the present disclosure may include a floor 5 and a structural component 10 attached to the floor 5.

The floor 5 may have a front edge facing the front of the vehicle and a rear edge facing the rear of the vehicle. A pair of side sills 6 may be connected to both side edges of the floor 5 using fasteners, welding, and/or the like, respectively. The floor 5 may be a center floor panel whose front edge is connected to a front structure of the vehicle.

Figure 17:
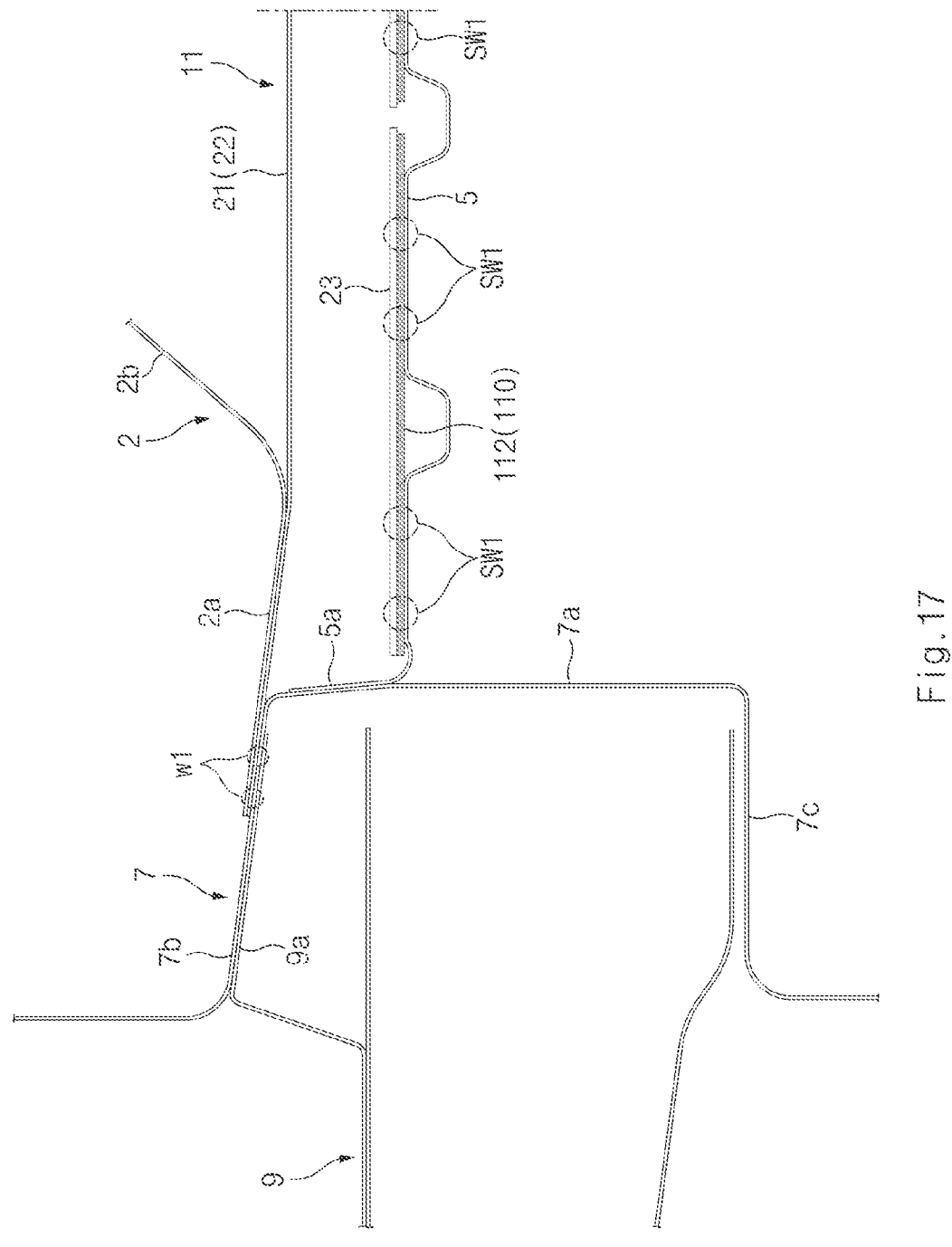
FIG. 17 illustrates a cross-sectional view, taken along line H-H of FIG. 16.
Figure 20:
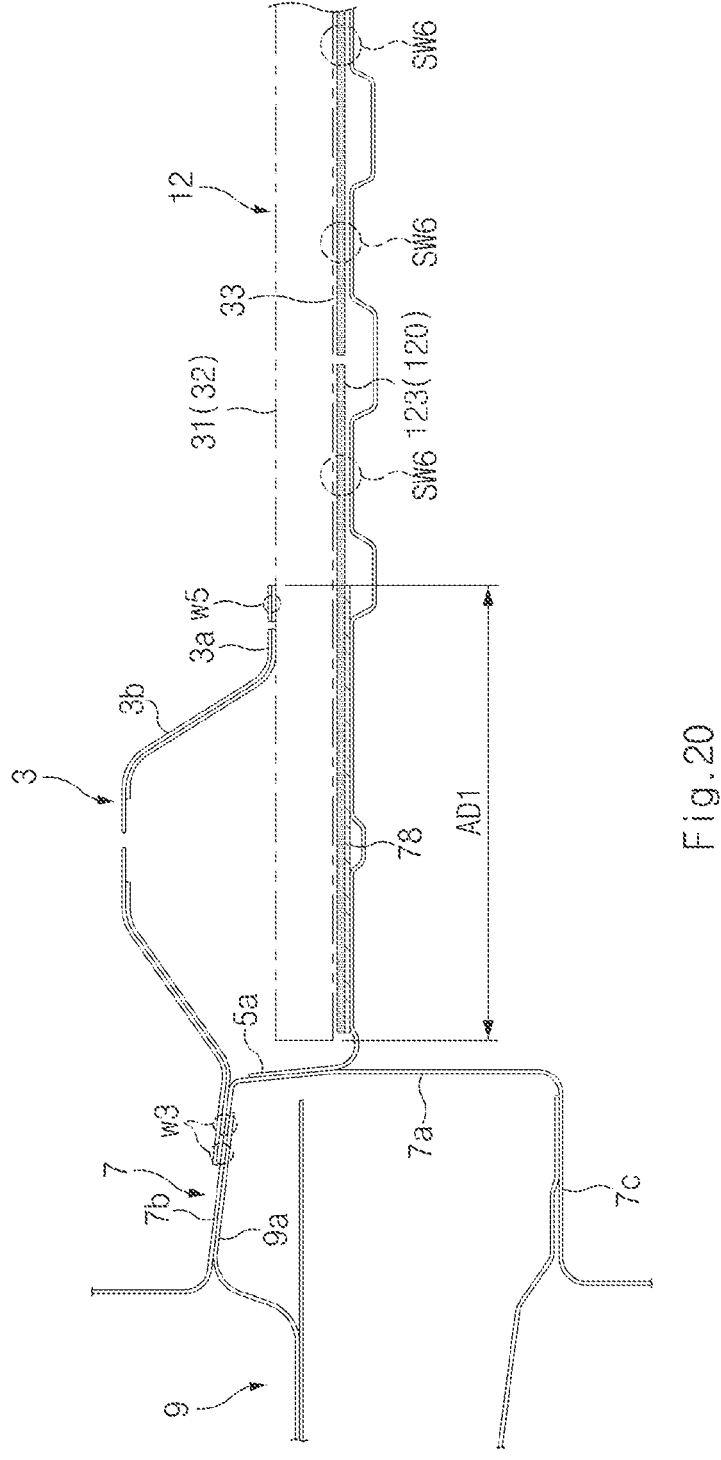
FIG. 20 illustrates a cross-sectional view, taken along line I-I of FIG. 19.
Figure 21:
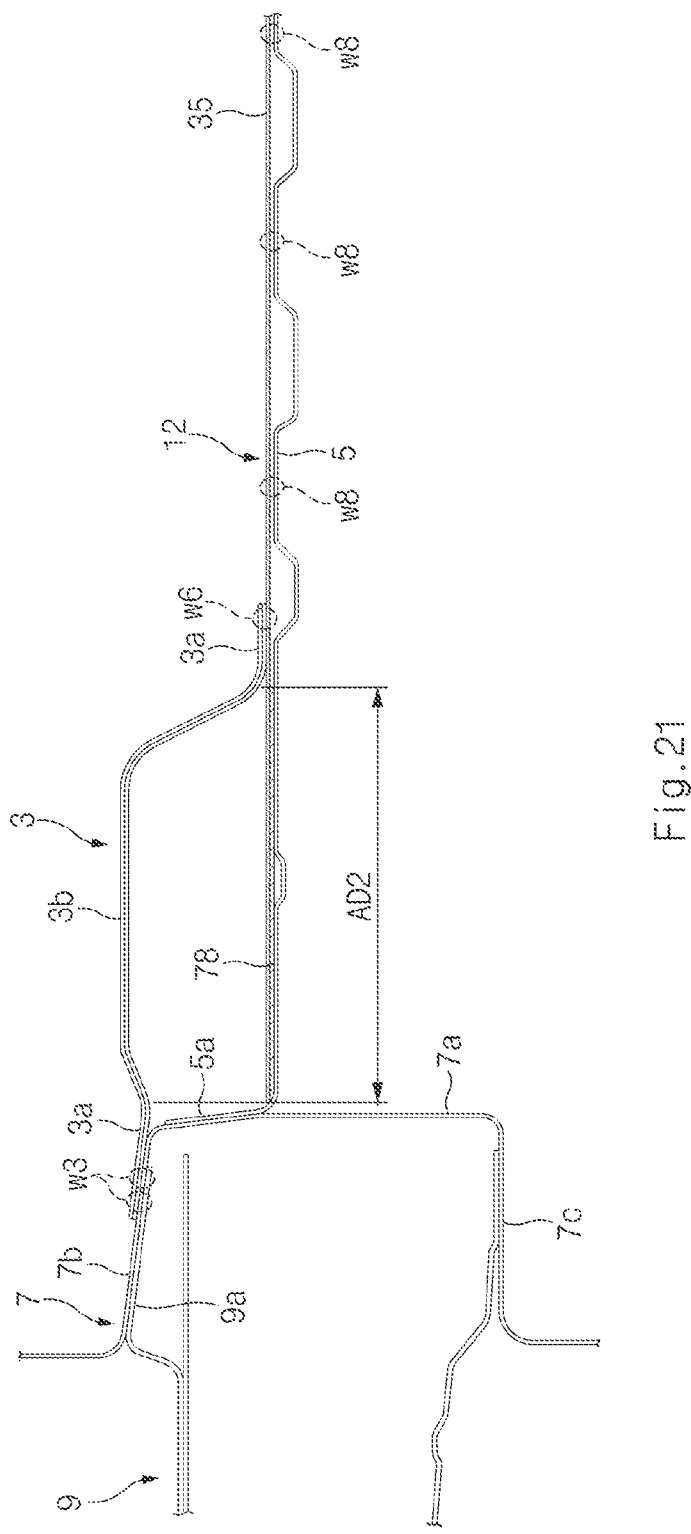
FIG. 21 illustrates a cross-sectional view, taken along line J-J of FIG. 19.
Figure 22:
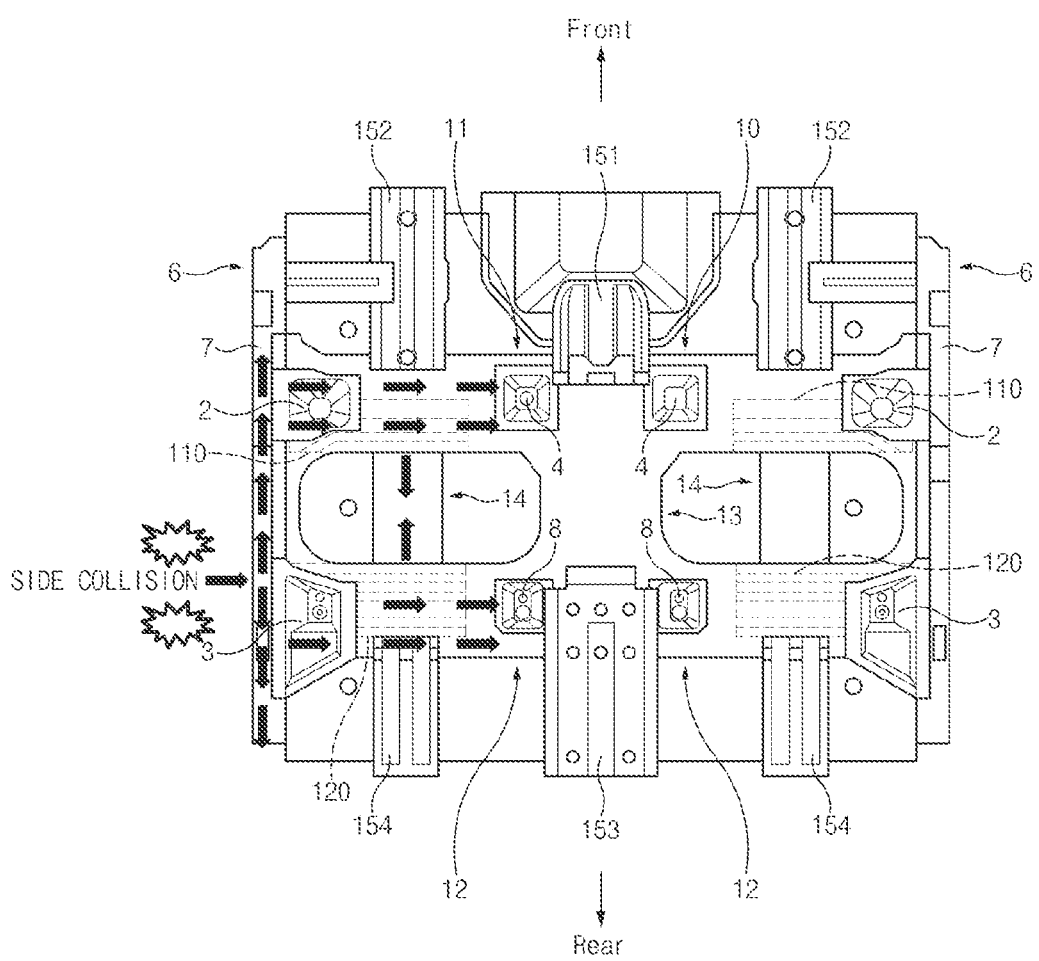
FIG. 22 illustrates a plan view of the transfer of an impact load to a vehicle body structure according to an exemplary embodiment of the present disclosure when a side impact/collision of the vehicle occurs.

Referring to FIGS. 17, 20, and 21, the floor 5 may have a pair of flanges 5a opposing each other, and the pair of flanges 5a may be provided on both side edges of the floor 5, respectively. Each flange 5a may extend vertically from the corresponding edge of the floor 5. Each side sill 6 may include a side sill inner 7, a side sill outer (not shown) joined to the side sill inner 7, and a side sill reinforcement 9 mounted in the side sill inner 7. The side sill inner 7 may include an inboard side wall 7a facing a passenger compartment, a top wall 7b extending horizontally from a top edge of the inboard side wall 7a, and a bottom wall 7c extending horizontally from a bottom edge of the inboard side wall 7a. The inboard side wall 7a of the side sill inner 7 may extend vertically. That is, each flange 5a of the floor 5 may have a shape matching that of the inboard side wall 7a of the side sill inner 7 and each flange 5a of the floor 5 may be joined to the inboard side wall 7a of the side sill inner 7. The side sill reinforcement 9 may have at least one projection portion 9a, and the projection portion 9a may be attached to the top wall 7b of the side sill inner 7 by welding and/or the like.

Figure 3:
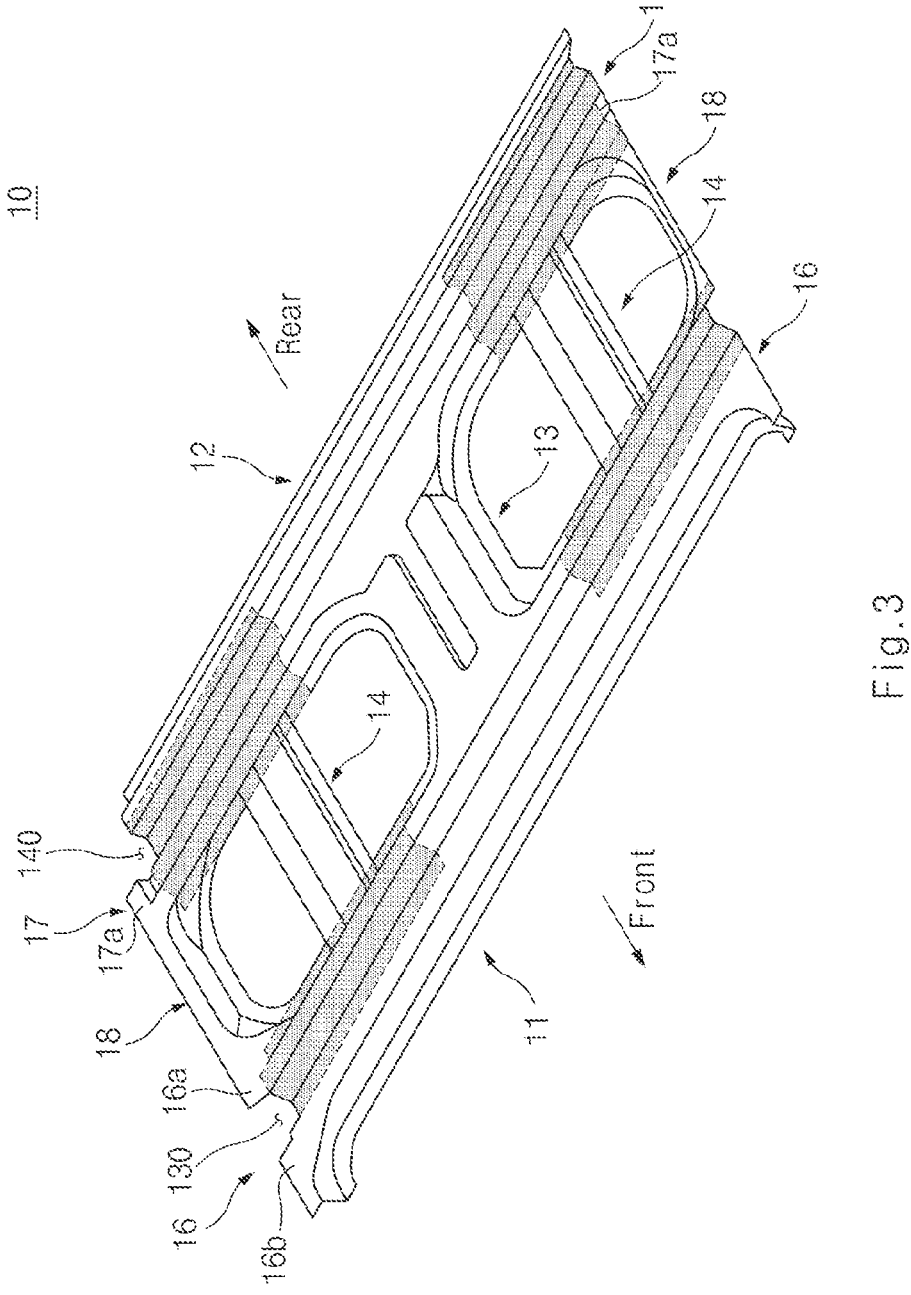
FIG. 3 illustrates a perspective view of a structural component, a front reinforcement, and a rear reinforcement in a vehicle body structure according to an exemplary embodiment of the present disclosure.

Referring to FIG. 3, the structural component 10 may include a front cross portion 11, a rear cross portion 12 located behind the front cross portion 11, and a connection structure connecting the front cross portion 11 and the rear cross portion 12 in a longitudinal direction of the vehicle.

According to an exemplary embodiment, the front cross portion 11, the rear cross portion 12, and the connection structure may form a unitary one-piece structure by hot stamping, hot forming, press hardening, and/or the like. That is, the front cross portion 11, the rear cross portion 12, and the connection structure may be made of the same material.

According to an exemplary embodiment, the connection structure may include a central extension portion 13 and a pair of side extension portions 14, and the extension portions 13 and 14 may connect the front cross portion 11 and the rear cross portion 12. A height of the central extension portion 13 and a height of the side extension portion 14 may be less than or equal to a height of the front cross portion 11.

According to an exemplary embodiment, the front cross portion 11, the rear cross portion 12, the central extension portion 13, and the pair of side extension portions 14 may form a unitary one-piece structure by hot stamping, hot forming, press hardening, and/or the like. That is, the front cross portion 11, the rear cross portion 12, the central extension portion 13, and the pair of side extension portions 14 may be made of the same material.

According to an exemplary embodiment, the structural component 10 may be made of a steel material. In particular, the structural component 10 may be made of an ultra high strength steel material.

According to an exemplary embodiment, the structural component 10 may be attached to the floor 5 and the side sill inners 7 by spot welding.

Referring to FIG. 2, a first front member 151 and a pair of second front members 152 may be connected to the front cross portion 11, and the first front member 151 and the pair of second front members 152 may extend from the front cross portion 11 toward the front of the vehicle. The first front member 151 may be aligned with the central extension portion 13 in the longitudinal direction of the vehicle, and each second front member 152 may be aligned with the corresponding side extension portion 14 in the longitudinal direction of the vehicle.

Referring to FIG. 2, a first rear member 153 and a pair of second rear members 154 may be connected to the rear cross portion 12, and the first rear member 153 and the pair of second rear members 154 may extend from the rear cross portion 12 toward the rear of the vehicle. The first rear member 153 may be aligned with the central extension portion 13 in the longitudinal direction of the vehicle, and each second rear member 154 may be aligned with the corresponding side extension portion 14 in the longitudinal direction of the vehicle.

Referring to FIG. 2, the front cross portion 11 may be closer to the front edge of the floor 5 than the rear cross portion 12. The front cross portion 11 may extend transverse to the pair of side sills 6. The front cross portion 11 may extend along the width of the vehicle and the width of the floor 5, and the front cross portion 11 may correspond to a front crossmember or front seat crossmember of an existing vehicle used for mounting vehicle seats.

The front cross portion 11 may have a substantially uniform cross-section throughout its entire length. That is, the front cross portion 11 may have the substantially uniform cross-section from end to end. Each end of the front cross portion 11 may contact or be close to the side sill inner 7 of the corresponding side sill 6. As the front cross portion 11 has the uniform cross-section throughout its entire length, and the cross-section of the front cross portion 11 does not vary throughout its entire length, stiffness of the front cross portion 11 may be improved, and thus the amount of intrusion thereof may be significantly reduced (approximately 16%) during a side impact/collision.

According to an exemplary embodiment, the front cross portion 11 may have an M-shaped cross-section uniformly extending along its longitudinal axis.

Figure 5:
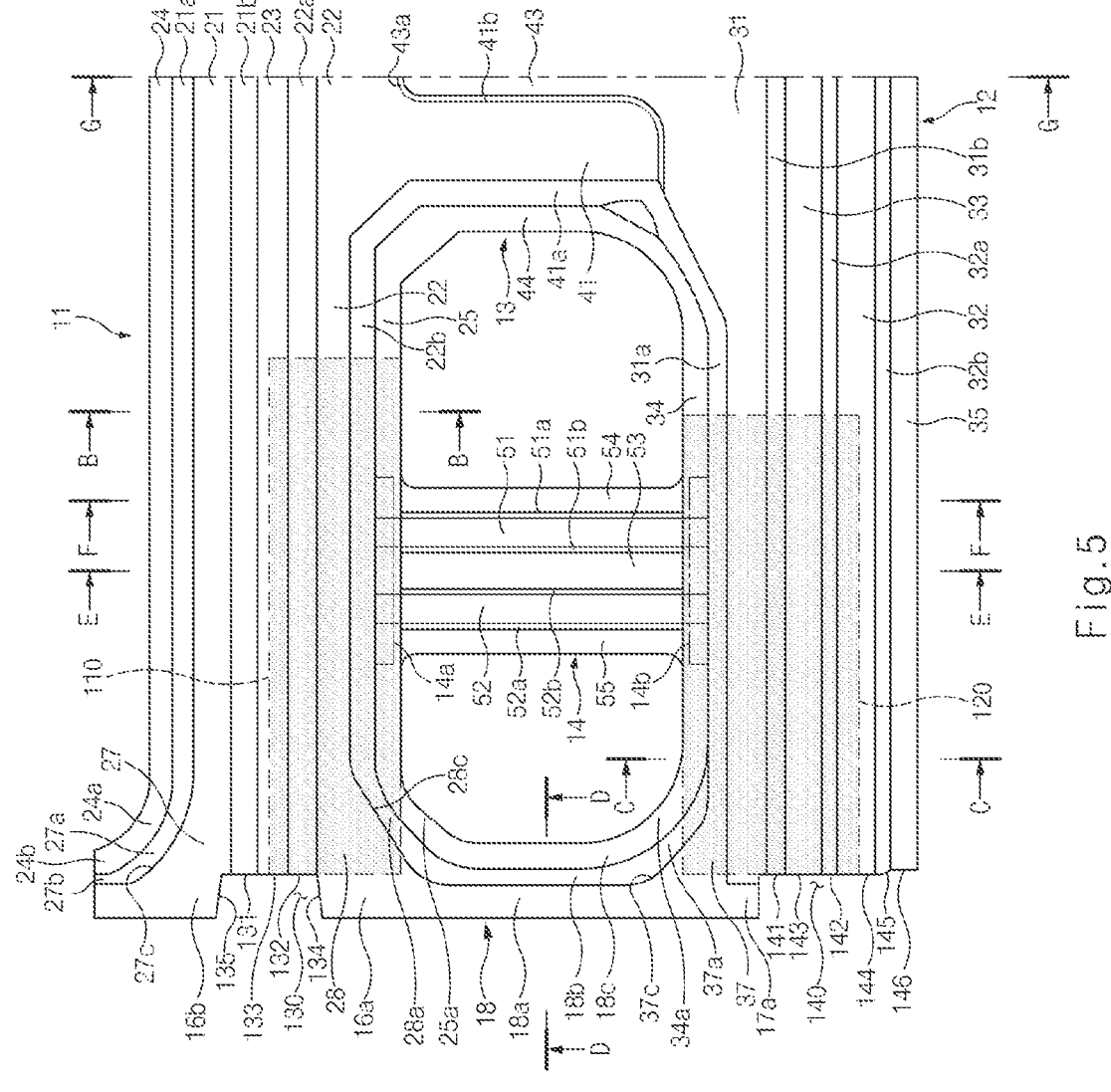
FIG. 5 illustrates a view of portion A of FIG. 4.
Figure 8:
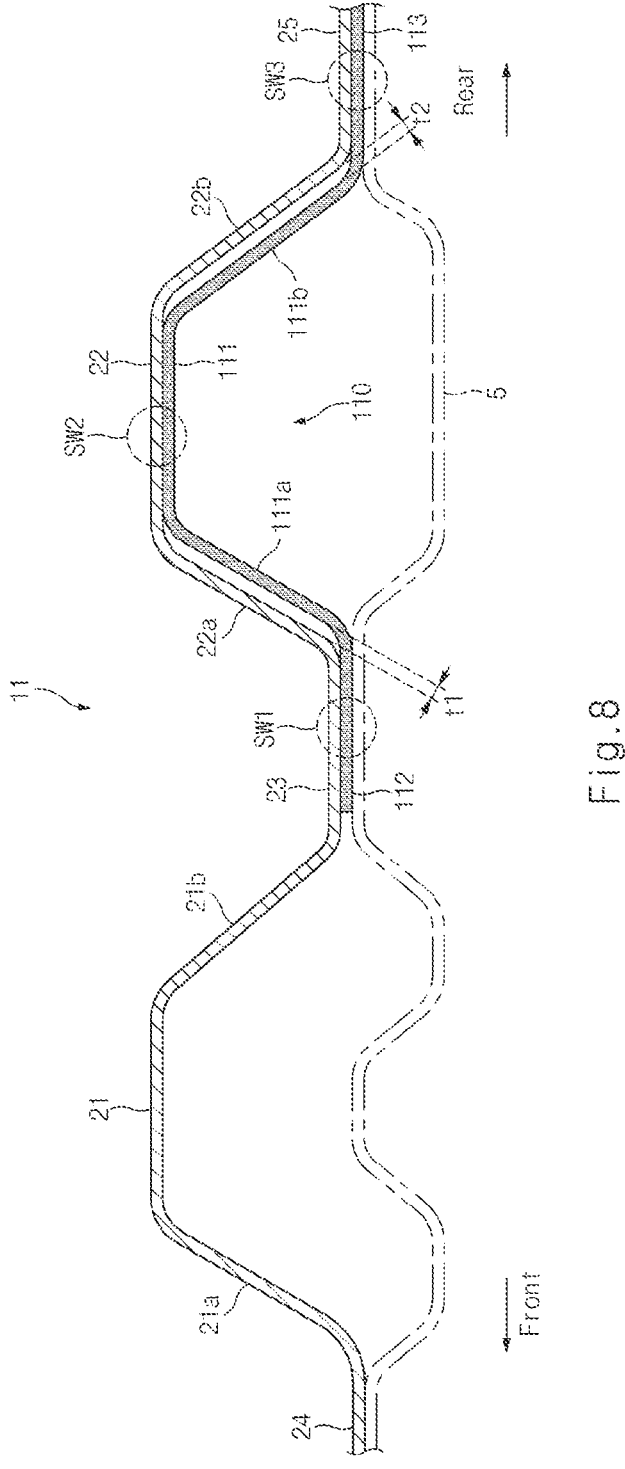
FIG. 8 illustrates a cross-sectional view, taken along line B-B of FIG. 5.

Referring to FIGS. 5 and 8, the front cross portion 11 may include a first top wall 21, a second top wall 22 spaced apart from the first top wall 21 toward the rear of the vehicle, a recessed wall 23 located between the first top wall 21 and the second top wall 22, a first flange 24 connected to the first top wall 21, and a second flange 25 connected to the second top wall 22. The first flange 24 may extend along a front edge of the front cross portion 11, and the second flange 25 may extend along a rear edge of the front cross portion 11.

Figure 4:
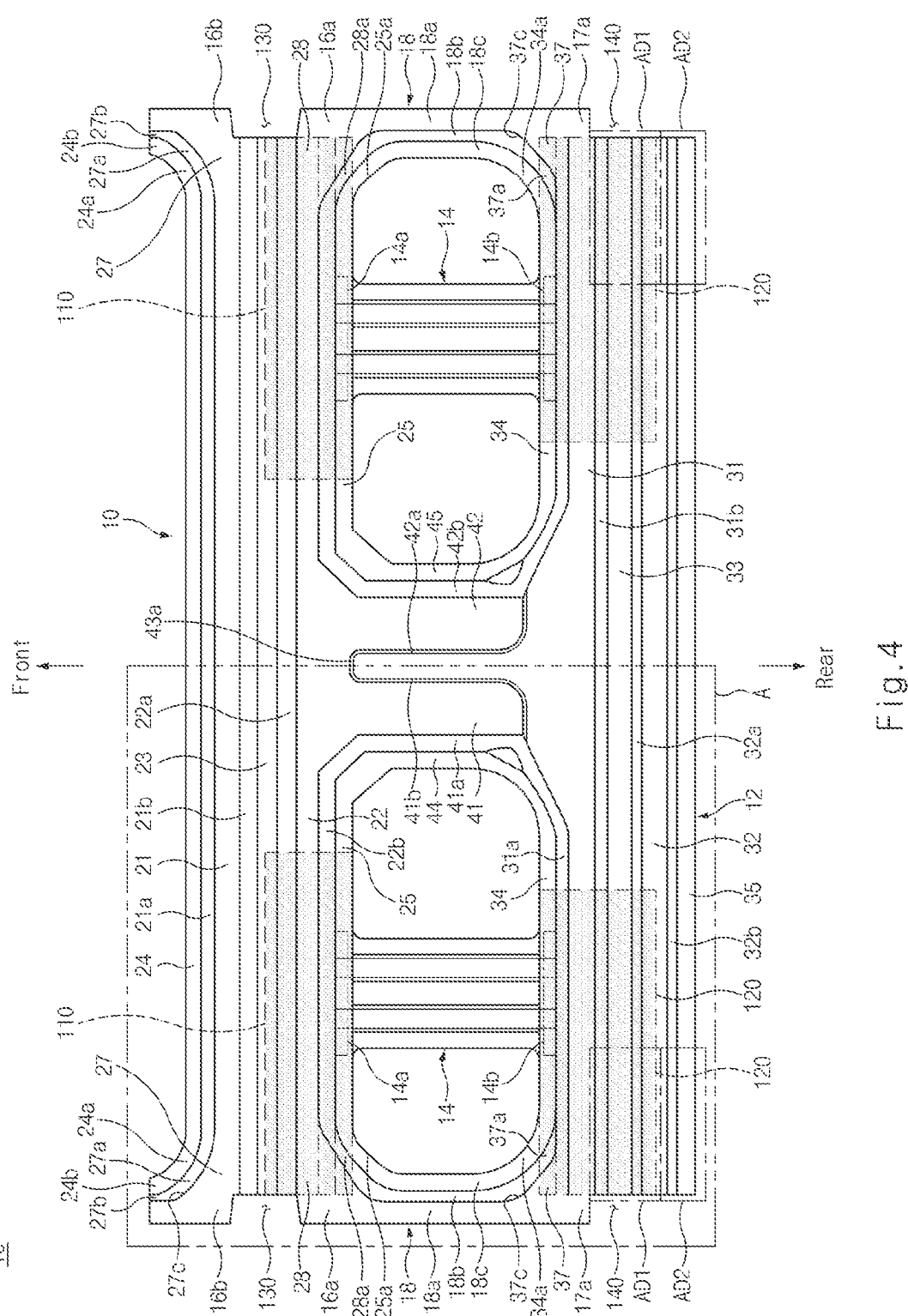
FIG. 4 illustrates a plan view of a structural component, a front reinforcement, and a rear reinforcement in a vehicle body structure according to an exemplary embodiment of the present disclosure.

Referring to FIGS. 4 and 8, the first top wall 21, the second top wall 22, the recessed wall 23, the first flange 24, and the second flange 25 may extend along the longitudinal axis of the front cross portion 11. The first top wall 21, the second top wall 22, the recessed wall 23, the first flange 24, and the second flange 25 may be parallel to each other.

Referring to FIG. 8, the first top wall 21 may extend horizontally, and a front edge of the first top wall 21 may be connected to a rear edge of the first flange 24 through a first front connection wall 21a. The first front connection wall 21a may extend obliquely from the first top wall 21 to the first flange 24. A rear edge of the first top wall 21 may be connected to a front edge of the recessed wall 23 through a first rear connection wall 21b. The first rear connection wall 21b may extend obliquely from the first top wall 21 to the recessed wall 23.

Referring to FIG. 8, the second top wall 22 may extend horizontally, and a front edge of the second top wall 22 may be connected to a rear edge of the recessed wall 23 through a second front connection wall 22a. The second front connection wall 22a may extend obliquely from the second top wall 22 to the recessed wall 23. A rear edge of the second top wall 22 may be connected to a front edge of the second flange 25 through a second rear connection wall 22b. The second rear connection wall 22b may extend obliquely from the second top wall 22 to the second flange 25.

Referring to FIG. 8, the recessed wall 23 may extend horizontally between a bottom end of the first rear connection wall 21b and a bottom end of the second front connection wall 22a so that the recessed wall 23 may be recessed from the first top wall 21 and the second top wall 22 toward the floor 5. The first flange 24 may extend horizontally from a bottom end of the first front connection wall 21a so that the first flange 24 may be recessed from the first top wall 21 toward the floor 5, and the second flange 25 may extend horizontally from a bottom end of the second rear connection wall 22b so that the second flange 25 may be recessed from the second top wall 22 toward the floor 5. A depth of the recessed wall 23 may be the same as or similar to a depth of the first flange 24 and a depth of the second flange 25. The first flange 24, the second flange 25, and the recessed wall 23 may be joined to the floor 5 using fasteners, welding, and/or the like.

According to an exemplary embodiment, the first flange 24, a portion of the second flange 25, and a portion of the recessed wall 23 of the front cross portion 11 may be directly attached to the floor 5 by spot welding.

Referring to FIG. 8, the front cross portion 11 may have the M-shaped cross-section through the first top wall 21, the second top wall 22, the recessed wall 23, the first flange 24, and the second flange 25, and accordingly the stiffness of the front cross portion 11 may be improved.

Referring to FIGS. 4 and 5, the front cross portion 11 may include a pair of first end top walls 27 connected to both ends of the first top wall 21, a pair of first end flanges 24a connected to both ends of the first flange 24, and a pair of first tapered walls 27a connected to both ends of the first front connection wall 21a.

Each first end top wall 27 may be gradually enlarged from the front cross portion 11 toward the side sill 6. Specifically, the width of the first end top wall 27 may gradually increase from the corresponding end of the first top wall 21 of the front cross portion 11 toward the side sill 6. Referring to FIG. 5, the first end top wall 27 may have a front edge 27c inclined at a predetermined angle with respect to the longitudinal axis of the front cross portion 11.

Each first end flange 24a may extend obliquely from the corresponding end of the first flange 24. An axis of the first end flange 24a may be inclined at a predetermined angle with respect to the longitudinal axis of the front cross portion 11.

The first end flange 24a may be connected to the front edge 27c of the first end top wall 27 through the first tapered wall 27a. The first end flange 24a may be recessed from the first end top wall 27 toward the floor 5. A straight flange 24b may extend from the first end flange 24a toward the front of the vehicle, and the straight flange 24b may be attached to the floor 5 by spot welding and/or the like.

Each first tapered wall 27a may extend obliquely from the corresponding end of the first front connection wall 21a. An axis of the first tapered wall 27a may be inclined at a predetermined angle with respect to the longitudinal axis of the front cross portion 11. The first tapered wall 27a may extend along the front edge 27c of the first end top wall 27. A straight extension wall 27b may extend from the first tapered wall 27a toward the front of the vehicle, and the straight extension wall 27b may be attached to the side sill inner 7 by spot welding and/or the like.

As described above, the first end top wall 27, the first end flange 24a, and the first tapered wall 27a may form an inclined structure so that an impact load generated during a side impact/collision of the vehicle may be stably transferred and distributed to the structural component 10 and the floor 5.

Referring to FIGS. 4 and 5, the front cross portion 11 may include a pair of second end top walls 28 connected to both ends of the second top wall 22, a pair of second end flanges 25a connected to both ends of the second flange 25, and a pair of second tapered walls 28a connected to both ends of the second rear connection wall 22b.

Each second end top wall 28 may be gradually enlarged from the front cross portion 11 toward the side sill 6. Specifically, the width of the second end top wall 28 may gradually increase from the corresponding end of the second top wall 22 of the front cross portion 11 toward the side sill 6. Referring to FIG. 5, the second end top wall 28 may have a rear edge 28c inclined at a predetermined angle with respect to the longitudinal axis of the front cross portion 11.

Each second end flange 25a may extend obliquely from the corresponding end of the second flange 25. An axis of the second end flange 25a may be inclined at a predetermined angle with respect to the longitudinal axis of the front cross portion 11.

The second end flange 25a may be connected to the rear edge 28c of the second end top wall 28 through the second tapered wall 28a. The second end flange 25a may be recessed from the second end top wall 28 toward the floor 5.

The second tapered wall 28a may extend obliquely from the corresponding end of the second rear connection wall 22b. An axis of the second tapered wall 28a may be inclined at a predetermined angle with respect to the longitudinal axis of the front cross portion 11. The second tapered wall 28a may extend along the rear edge 28c of the second end top wall 28.

As described above, the second end top wall 28, the second end flange 25a, and the second tapered wall 28a may form an inclined structure so that an impact load generated during a side impact/collision of the vehicle may be stably transferred and distributed to the structural component 10 and the floor 5.

Referring to FIGS. 4 and 5, the structural component 10 may include a pair of side flanges 16a connected to both ends of the front cross portion 11, respectively. A longitudinal axis of each side flange 16a may be perpendicular to the longitudinal axis of the front cross portion 11. The side flange 16a may be attached to the side sill inner 7 of the side sill 6 by spot welding and/or the like. The side flange 16a may be connected to the second end top wall 28 of the front cross portion 11, and the side flange 16a may extend along a longitudinal axis of the side sill 6.

Referring to FIGS. 4 and 5, the structural component 10 may further include a pair of sub-side flanges 16b connected to both ends of the front cross portion 11, respectively. A longitudinal axis of each sub-side flange 16b may be perpendicular to the longitudinal axis of the front cross portion 11. The sub-side flange 16b may be located in front of the corresponding side flange 16a and be spaced apart from the corresponding side flange 16a by a predetermined gap. The sub-side flange 16b may be attached to the side sill inner 7 of the side sill 6 by spot welding and/or the like. The sub-side flange 16b may be connected to the first end top wall 27 of the front cross portion 11, and the sub-side flange 16b may extend along the longitudinal axis of the side sill 6. The straight flange 24b may be connected to the sub-side flange 16b through the straight extension wall 27b. Each end of the front cross portion 11 may contact or be close to the inboard side wall 7a of the side sill inner 7 of the side sill 6, and the side flange 16a and the sub-side flange 16b may protrude from the corresponding end of the front cross portion 11 toward the exterior of the vehicle.

Figure 15:
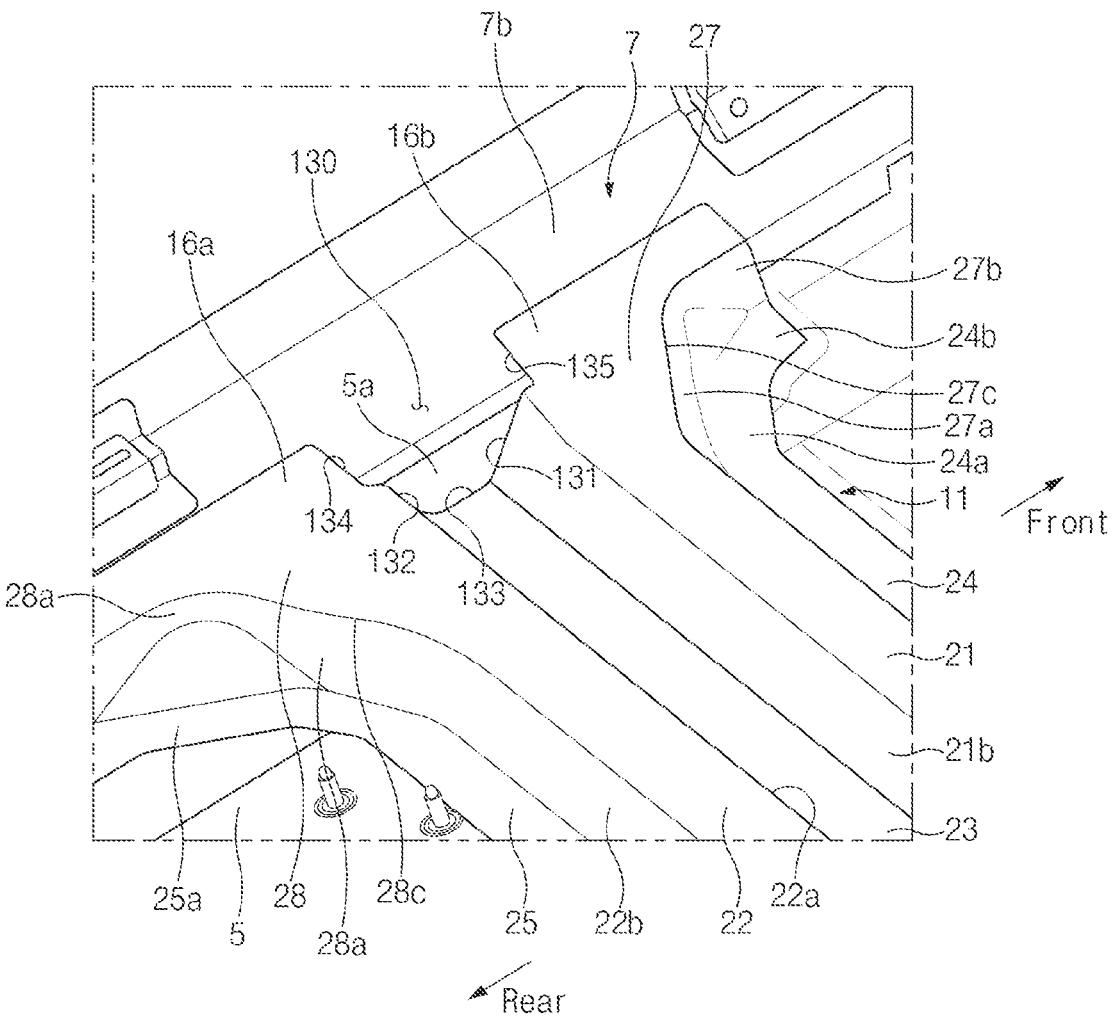
FIG. 15 illustrates a state in which a front cut-out portion of a structural component of a vehicle body structure according to an exemplary embodiment of the present disclosure is aligned with a side sill inner.

Referring to FIGS. 4, 5, and 15, the structural component 10 may include a pair of front cut-out portions 130 provided at both ends of the front cross portion 11, respectively. Each front cut-out portion 130 may be defined between the corresponding end of the front cross portion 11, the corresponding side flange 16a, and the corresponding sub-side flange 16b.

Referring to FIG. 15, the front cut-out portion 130 may be defined by an end 131 of the first rear connection wall 21b, an end 132 of the second front connection wall 22a, an end 133 of the recessed wall 23, a front end 134 of the side flange 16a, and a rear end 135 of the sub-side flange 16b. In particular, the front cross portion 11 may have a channel-shaped cross-section defined by the first rear connection wall 21b, the second front connection wall 22a, and the recessed wall 23. The channel-shaped cross-section defined by the first rear connection wall 21b, the second front connection wall 22a, and the recessed wall 23 may extend uniformly throughout the entire length of the front cross portion 11. The end 131 of the first rear connection wall 21b, the end 132 of the second front connection wall 22a, and the end 133 of the recessed wall 23 in the front cross portion 11 may contact or be close to the side sill inner 7, and the front cut-out portion 130 may be aligned with a portion of the side sill inner 7.

Figure 6:
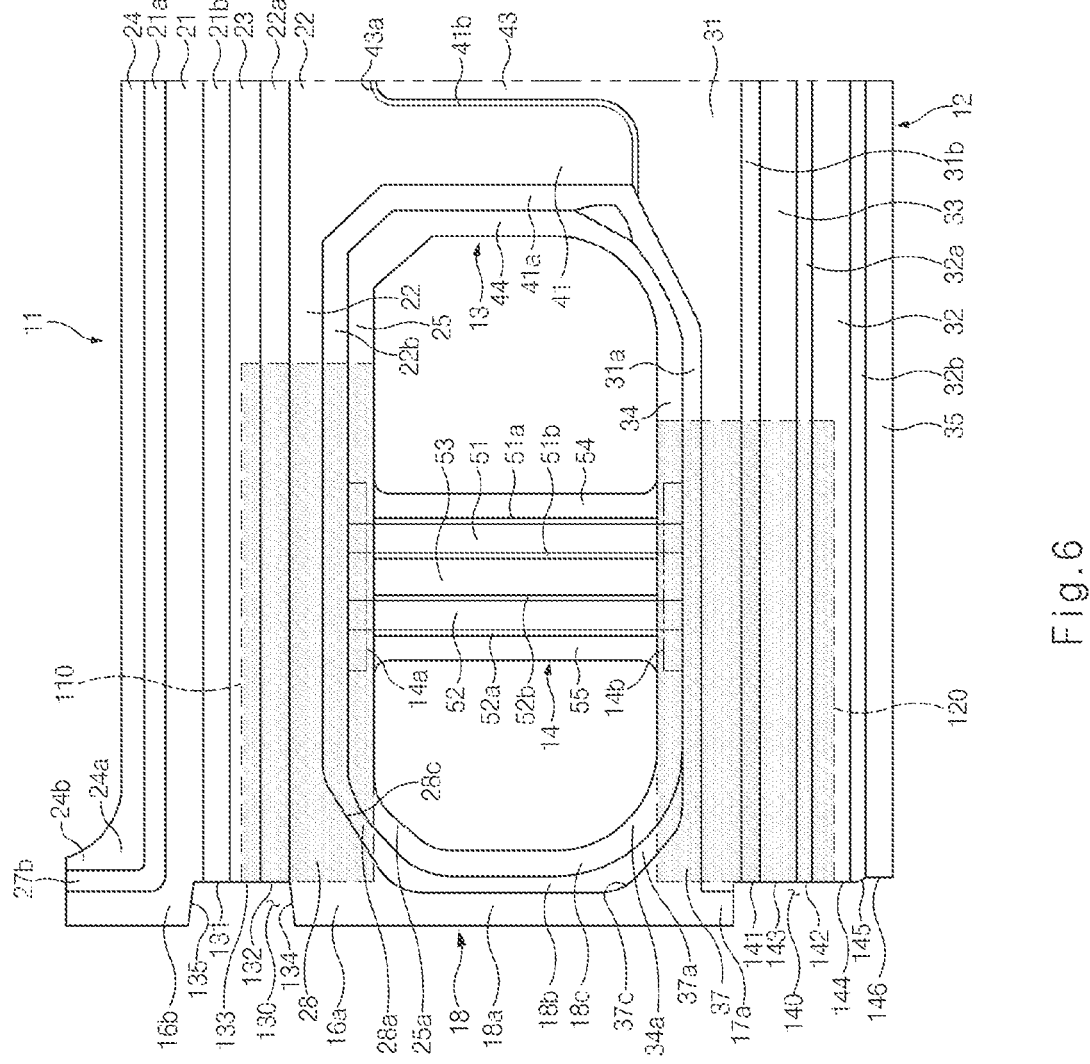
FIG. 6 illustrates a modification to the exemplary embodiment of FIG. 5.

FIG. 6 illustrates a structural component according to another exemplary embodiment of the present disclosure. Referring to FIG. 6, the first end top wall 27 may be removed between the sub-side flange 16b and the corresponding end of the front cross portion 11 so that the sub-side flange 16b may be perpendicularly connected to the corresponding end of the front cross portion 11. The first tapered wall 27a may be removed between the straight extension wall 27b and the first front connection wall 21a so that the straight extension wall 27b may be perpendicularly connected to the corresponding end of the first front connection wall 21a.

Figure 7:
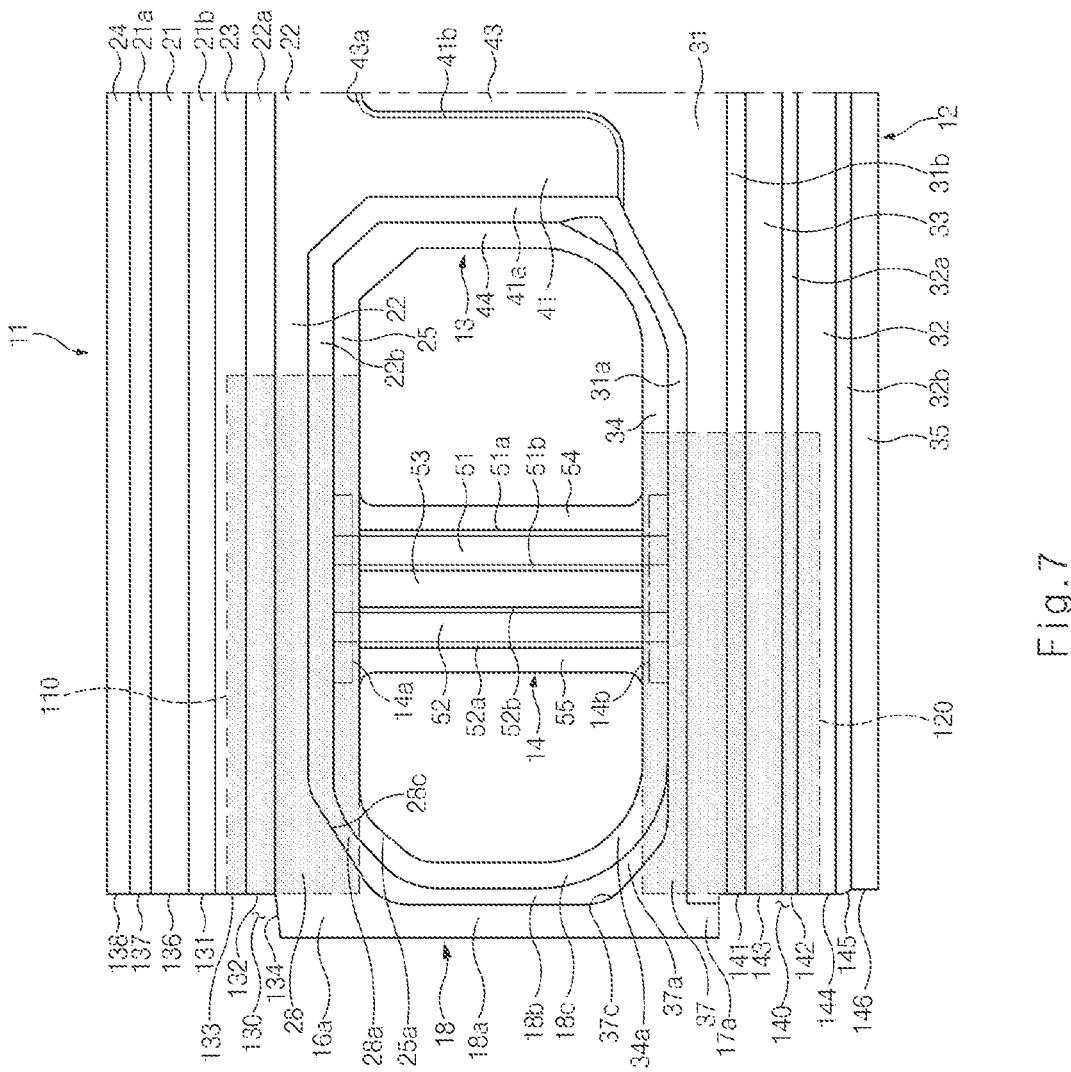
FIG. 7 illustrates another modification to the exemplary embodiment of FIG. 5.

FIG. 7 illustrates a structural component according to another exemplary embodiment of the present disclosure. Referring to FIG. 7, the sub-side flange 16b, the first end top wall 27, the first end flange 24a, the first tapered wall 27a, the straight flange 24b, and the straight extension wall 27b may be removed so that an end 136 of the first top wall 21, an end 137 of the first front connection wall 21a, and an end 138 of the first flange 24 may be aligned with the end 131 of the first rear connection wall 21b. Accordingly, the front cut-out portion 130 may be defined by the end 131 of the first rear connection wall 21b, the end 132 of the second front connection wall 22a, the end 133 of the recessed wall 23, the end 136 of the first top wall 21, the end 137 of the first front connection wall 21a, the end 138 of the first flange 24, and the front end 134 of the side flange 16a.

Referring to FIG. 2, the rear cross portion 12 may be closer to the rear edge of the floor 5 than the front cross portion 11. The rear cross portion 12 may extend transverse to the pair of side sills 6. The rear cross portion 12 may extend along the width of the vehicle and the width of the floor 5, and the rear cross portion 12 may correspond to a rear crossmember or rear seat crossmember of an existing vehicle used for mounting vehicle seats.

The rear cross portion 12 may have a substantially uniform cross-section throughout its entire length. That is, the rear cross portion 12 may have the substantially uniform cross-section from end to end. Each end of the rear cross portion 12 may contact or be close to the side sill inner 7 of the corresponding side sill 6. As the rear cross portion 12 has the uniform cross-section throughout its entire length, and the cross-section of the rear cross portion 12 does not vary throughout its entire length, stiffness of the rear cross portion 12 may be improved, and thus the amount of intrusion thereof may be significantly reduced (approximately 16%) during a side impact/collision.

According to an exemplary embodiment, the rear cross portion 12 may have an M-shaped cross-section uniformly extending along its longitudinal axis.

Figure 9:
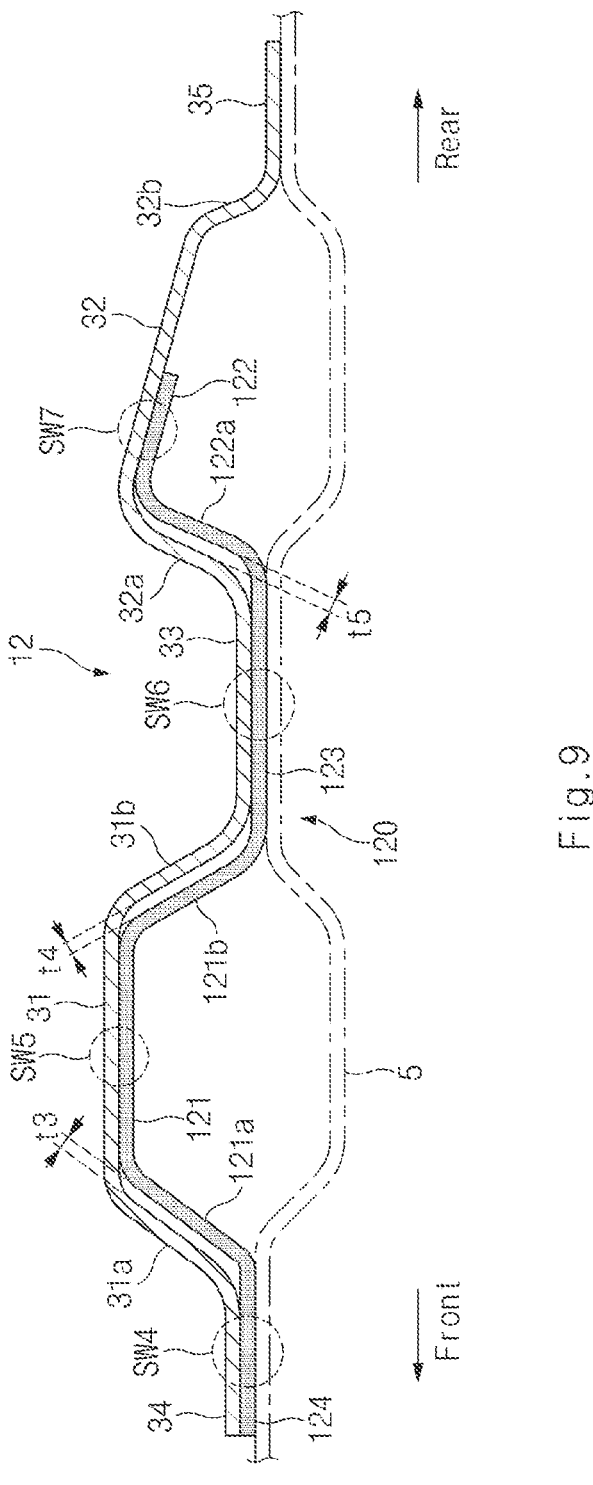
FIG. 9 illustrates a cross-sectional view, taken along line C-C of FIG. 5.

Referring to FIGS. 5 and 9, the rear cross portion 12 may include a first top wall 31, a second top wall 32 spaced apart from the first top wall 31 toward the rear of the vehicle, a recessed wall 33 located between the first top wall 31 and the second top wall 32, a first flange 34 connected to the first top wall 31, and a second flange 35 connected to the second top wall 32. The first flange 34 may extend along a front edge of the rear cross portion 12, and the second flange 35 may extend along a rear edge of the rear cross portion 12.

Referring to FIG. 5, the first top wall 31, the second top wall 32, the recessed wall 33, the first flange 34, and the second flange 35 may extend along a longitudinal axis of the rear cross portion 12. The first top wall 31, the second top wall 32, the recessed wall 33, the first flange 34, and the second flange 35 may be parallel to each other.

Referring to FIG. 9, the first top wall 31 may extend horizontally, and a front edge of the first top wall 31 may be connected to a rear edge of the first flange 34 through a first front connection wall 31a. The first front connection wall 31a may extend obliquely from the first top wall 31 to the first flange 34. A rear edge of the first top wall 31 may be connected to a front edge of the recessed wall 33 through a first rear connection wall 31b. The first rear connection wall 31b may extend obliquely from the first top wall 31 to the recessed wall 33.

Referring to FIG. 9, the second top wall 32 may extend downwardly and obliquely toward the rear of the vehicle, and a front edge of the second top wall 32 may be connected to a rear edge of the recessed wall 33 through a second front connection wall 32a. The second front connection wall 32a may extend obliquely from the second top wall 32 to the recessed wall 33. A rear edge of the second top wall 32 may be connected to a front edge of the second flange 35 through a second rear connection wall 32b. The second rear connection wall 32b may extend obliquely from the second top wall 32 to the second flange 35.

Referring to FIG. 9, the recessed wall 33 may extend horizontally between a bottom end of the first rear connection wall 31b and a bottom end of the second front connection wall 32a so that the recessed wall 33 may be recessed from the first top wall 31 and the second top wall 32 toward the floor 5. The first flange 34 may extend horizontally from a bottom end of the first front connection wall 31a so that the first flange 34 may be recessed from the first top wall 31 toward the floor 5, and the second flange 35 may extend horizontally from a bottom end of the second rear connection wall 32b so that the second flange 35 may be recessed from the second top wall 32 toward the floor 5. The first flange 34, the second flange 35, and the recessed wall 33 may be joined to the floor 5 using fasteners, welding, and/or the like.

According to an exemplary embodiment, the first flange 34, the second flange 35, and the recessed wall 33 of the rear cross portion 12 may be attached to the floor 5 by spot welding.

Referring to FIG. 9, the rear cross portion 12 may have a transformed M-shaped cross-section through the first top wall 31, the second top wall 32, the recessed wall 33, the first flange 34, and the second flange 35, and accordingly the stiffness of the rear cross portion 12 may be improved.

Referring to FIGS. 4 and 5, the rear cross portion 12 may include a pair of end top walls 37 connected to both ends of the first top wall 31, a pair of end flanges 34a connected to both ends of the first flange 34, and a pair of tapered walls 37a connected to both ends of the first front connection wall 31a.

Figure 18:
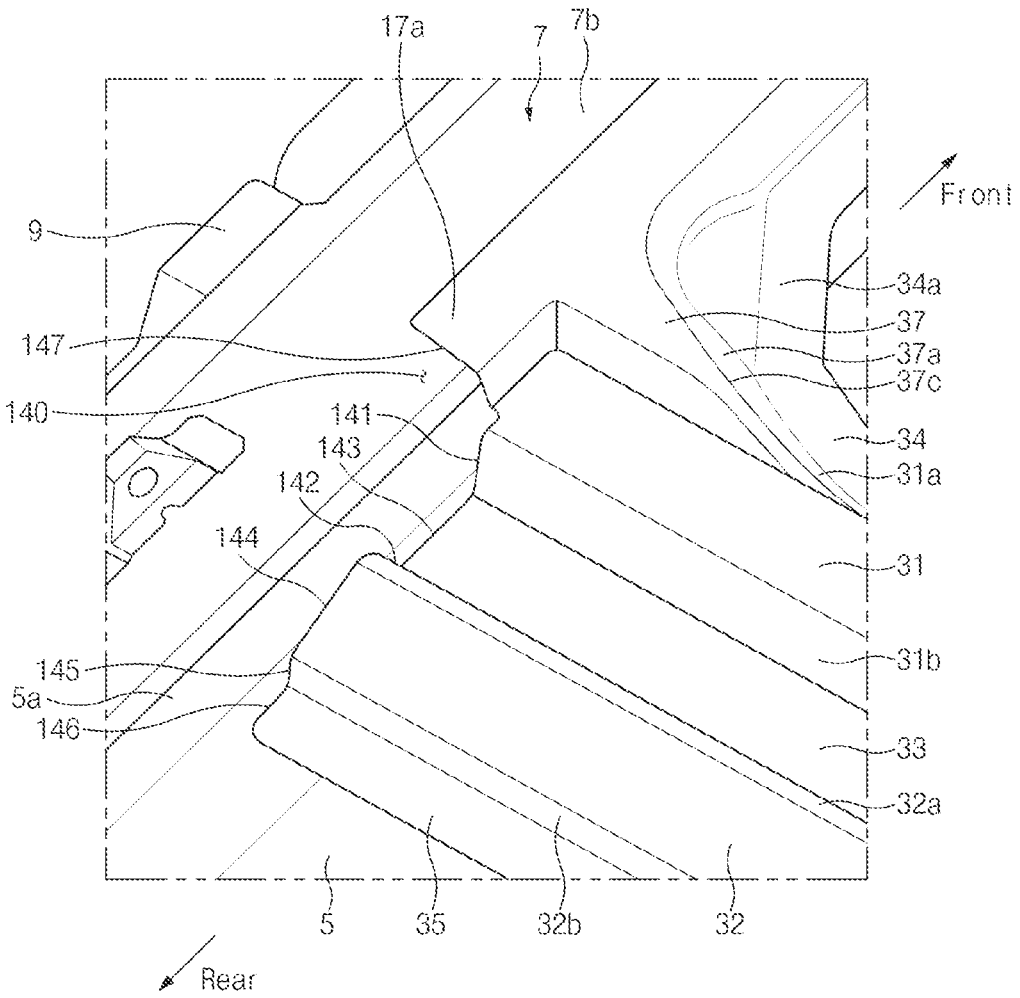
FIG. 18 illustrates a state in which a rear cut-out portion of a structural component of a vehicle body structure according to an exemplary embodiment of the present disclosure is aligned with a side sill inner.

Each end top wall 37 may be gradually enlarged from the rear cross portion 12 toward the side sill 6. Specifically, the width of the end top wall 37 may gradually increase from the corresponding end of the first top wall 31 of the rear cross portion 12 toward the side sill 6. Referring to FIG. 5, the end top wall 37 may have a front edge 37c inclined at a predetermined angle with respect to the longitudinal axis of the rear cross portion 12. Referring to FIG. 18, the end top wall 37 may be raised upwardly from the first top wall 31 of the rear cross portion 12.

Each end flange 34a may extend obliquely from the corresponding end of the first flange 34. An axis of the end flange 34a may be inclined at a predetermined angle with respect to the longitudinal axis of the rear cross portion 12.

The end flange 34a may be connected to the front edge 37c of the end top wall 37 through the tapered wall 37a. The end flange 34a may be recessed from the end top wall 37 toward the floor 5.

Each tapered wall 37a may extend obliquely from the corresponding end of the first front connection wall 31a. An axis of the tapered wall 37a may be inclined at a predetermined angle with respect to the longitudinal axis of the rear cross portion 12. The tapered wall 37a may extend along the front edge 37c of the end top wall 37.

As described above, the end top wall 37, the end flange 34a, and the tapered wall 37a may form an inclined structure so that an impact load generated during a side impact/collision of the vehicle may be stably transferred and distributed to the structural component 10 and the floor 5.

Referring to FIGS. 4 and 5, the structural component 10 may include a pair of side flanges 17a connected to both ends of the rear cross portion 12, respectively. A longitudinal axis of each side flange 17a may be perpendicular to the longitudinal axis of the rear cross portion 12. Each side flange 17a may be attached to the side sill inner 7 of the corresponding side sill 6 by welding and/or the like. The side flange 17a may be connected to the corresponding end top wall 37 of the rear cross portion 12, and the side flange 17a may extend along the longitudinal axis of the side sill 6. Each end of the rear cross portion 12 may contact or be close to the inboard side wall 7a of the side sill inner 7 of the corresponding side sill 6, and the side flange 17a may protrude from the corresponding end of the rear cross portion 12 toward the exterior of the vehicle.

Referring to FIGS. 4, 5, and 18, the structural component 10 may include a pair of rear cut-out portions 140 provided at both ends of the rear cross portion 12, respectively. Each rear cut-out portion 140 may be defined between the corresponding end of the rear cross portion 12 and the side flange 17a.

Referring to FIG. 18, the rear cut-out portion 140 may be defined by an end 141 of the first rear connection wall 31b, an end 142 of the second front connection wall 32a, an end 143 of the recessed wall 33, an end 144 of the second top wall 32, an end 145 of the second rear connection wall 32b, an end 146 of the second flange 35, and an end 147 of the side flange 17a. In particular, the rear cross portion 12 may have a channel-shaped cross-section defined by the first rear connection wall 31b, the second front connection wall 32a, and the recessed wall 33. The channel-shaped cross-section defined by the first rear connection wall 31b, the second front connection wall 32a, and the recessed wall 33 may extend uniformly throughout the entire length of the rear cross portion 12. The end 141 of the first rear connection wall 31b, the end 142 of the second front connection wall 32a, the end 143 of the recessed wall 33, the end 144 of the second top wall 32, the end 145 of the second rear connection wall 32b, and the end 146 of the second flange 35 in the rear cross portion 12 may contact or be close to the side sill inner 7, and the rear cut-out portion 140 may be aligned with a portion of the side sill inner 7.

Referring to FIG. 2, the central extension portion 13 may be configured to integrally connect a central portion of the front cross portion 11 and a central portion of the rear cross portion 12. In particular, a longitudinal axis of the central extension portion 13 may be perpendicular to the longitudinal axis of the front cross portion 11 and the longitudinal axis of the rear cross portion 12. The central extension portion 13 may extend along a central longitudinal axis of the floor 5 to connect the front cross portion 11 and the rear cross portion 12, and accordingly the central extension portion 13 may correspond to a central longitudinal member of an existing vehicle extending in the central longitudinal axis of the floor 5.

According to an exemplary embodiment, the central extension portion 13 may have an M-shaped or channel-shaped cross-section uniformly extending along its longitudinal axis.

Referring to FIG. 4, the central extension portion 13 may include a first top wall 41, a second top wall 42 spaced apart from the first top wall 41 along the width direction of the vehicle, a recessed wall 43 located between the first top wall 41 and the second top wall 42, a first flange 44 connected to the first top wall 41, and a second flange 45 connected to the second top wall 42.

Referring to FIG. 4, the first top wall 41, the second top wall 42, the recessed wall 43, the first flange 44, and the second flange 45 may extend along the longitudinal direction of the central extension portion 13 and be parallel to each other. The recessed wall 43 may extend along the central longitudinal axis of the floor 5, and the first top wall 41 and the second top wall 42 may be located symmetrically with respect to the recessed wall 43. The first top wall 41 and the second top wall 42 may extend from the second top wall 22 of the front cross portion 11 along the longitudinal direction of the vehicle. The first top wall 41 and the second top wall 42 may extend from the second top wall 22 of the front cross portion 11 toward the rear cross portion 12, and the first flange 44 and the second flange 45 may extend from the second flange 25 of the front cross portion 11 to the first flange 34 of the rear cross portion 12.

Referring to FIG. 4, an outer edge of the first top wall 41 may be connected to the first flange 44 through a first outer connection wall 41*a*. The first outer connection wall 41*a* may extend obliquely from the first top wall 41 to the first flange 44. An inner edge of the first top wall 41 may be connected to the recessed wall 43 through a first inner connection wall 41*b*. The first inner connection wall 41*b* may extend obliquely from the first top wall 41 to the recessed wall 43.

Referring to FIG. 4, an inner edge of the second top wall 42 may be connected to the recessed wall 43 through a second inner connection wall 42*a*. The second inner connection wall 42*a* may extend obliquely from the second top wall 42 to the recessed wall 43. An outer edge of the second top wall 42 may be connected to the second flange 45 through a second outer connection wall 42*b*. The second outer connection wall 42*b* may extend obliquely from the second top wall 42 to the second flange 45.

Referring to FIG. 4, the first outer connection wall 41*a* and the second outer connection wall 42*b* may connect the second rear connection wall 22*b* of the front cross portion 11 and the first front connection wall 31*a* of the rear cross portion 12, and the first flange 44 and the second flange 45 may connect the second flange 25 of the front cross portion 11 and the first flange 34 of the rear cross portion 12.

Referring to FIG. 4, the recessed wall 43 may be connected between a bottom end of the first inner connection wall 41*b* and a bottom end of the second inner connection wall 42*a* so that the recessed wall 43 may be recessed from the first top wall 41 and the second top wall 42 toward the floor 5. The first flange 44 may be connected to a bottom end of the first outer connection wall 41*a* so that the first flange 44 may be recessed from the first top wall 41 toward the floor 5, and the second flange 45 may be connected to a bottom end of the second outer connection wall 42*b* so that the second flange 45 may be recessed from the second top wall 42 toward the floor 5. A depth of the recessed wall 43 may be less than a depth of the first flange 44 and a depth of the second flange 45. The first flange 44 and the second flange 45 may be joined to the floor 5 using fasteners, welding, and/or the like.

According to an exemplary embodiment, the first flange 44 and the second flange 45 of the central extension portion 13 may be attached to the floor 5 by spot welding.

Figure 13:
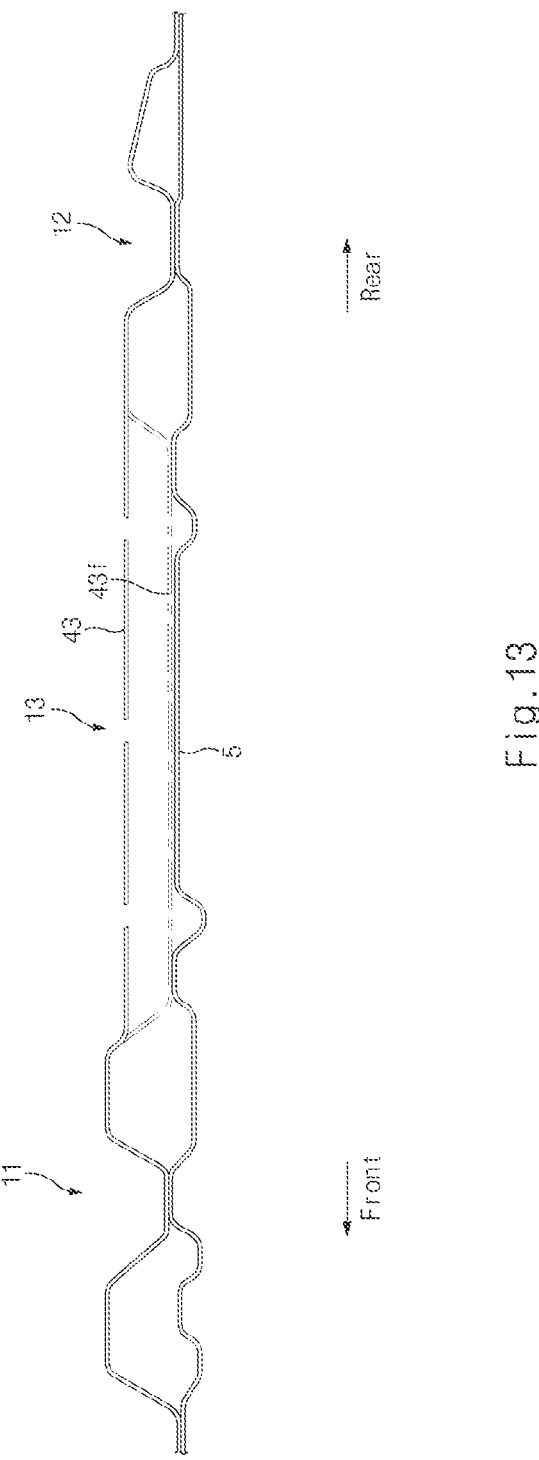
FIG. 13 illustrates a cross-sectional view, taken along line G-G of FIG. 5.

According to an exemplary embodiment, the depth of the recessed wall 43 (see a solid line of FIG. 13) may be less than the recessed depth of the first flange 44 and the recessed depth of the second flange 45. As illustrated in FIG. 13, the recessed wall 43 may be spaced apart from the floor 5.

According to another exemplary embodiment, a depth of a recessed wall 43*f* (see an imaginary line of FIG. 13) may be the same as or similar to the recessed depth of the first flange 44 and the recessed depth of the second flange 45. As illustrated in FIG. 13, the recessed wall 43*f* may be attached to the floor 5 by spot welding.

Referring to FIGS. 2 and 3, the pair of side extension portions 14 may be located symmetrically with respect to the central extension portion 13. Each side extension portion 14 may be configured to integrally connect the front cross portion 11 and the rear cross portion 12. In particular, a longitudinal axis of the side extension portion 14 may be perpendicular to the longitudinal axis of the front cross portion 11 and the longitudinal axis of the rear cross portion 12. The longitudinal axis of the side extension portion 14 may be parallel to the longitudinal axis of the central extension portion 13.

According to an exemplary embodiment, the side extension portion 14 may have an M-shaped or channel-shaped cross-section uniformly extending along its longitudinal axis.

According to an exemplary embodiment, the pair of side extension portions 14 together with the front cross portion 11, the rear cross portion 12, and the central extension portion 13 may form a unitary one-piece structure by hot stamping, hot forming, press hardening, and/or the like. That is, the front cross portion 11, the rear cross portion 12, the central extension portion 13, and the pair of side extension portions 14 may be made of the same material.

Referring to FIG. 5, each side extension portion 14 may include a first top wall 51, a second top wall 52 spaced apart from the first top wall 51 along the width direction of the vehicle, a recessed wall 53 located between the first top wall 51 and the second top wall 52, a first flange 54 connected to the first top wall 51, and a second flange 55 connected to the second top wall 52.

Referring to FIG. 5, the first top wall 51, the second top wall 52, the recessed wall 53, the first flange 54, and the second flange 55 may extend along the longitudinal direction of the side extension portion 14 and be parallel to each other. The first top wall 51 and the second top wall 52 may be located symmetrically with respect to the recessed wall 53.

Figure 11:
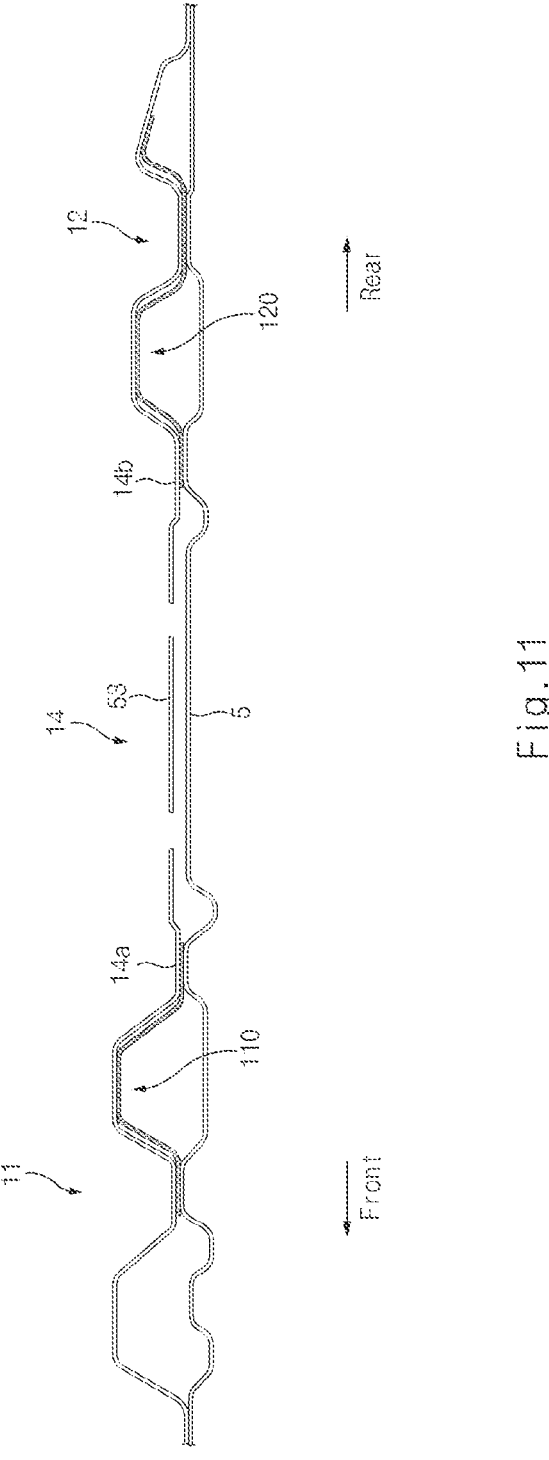
FIG. 11 illustrates a cross-sectional view, taken along line E-E of FIG. 5.
Figure 12:
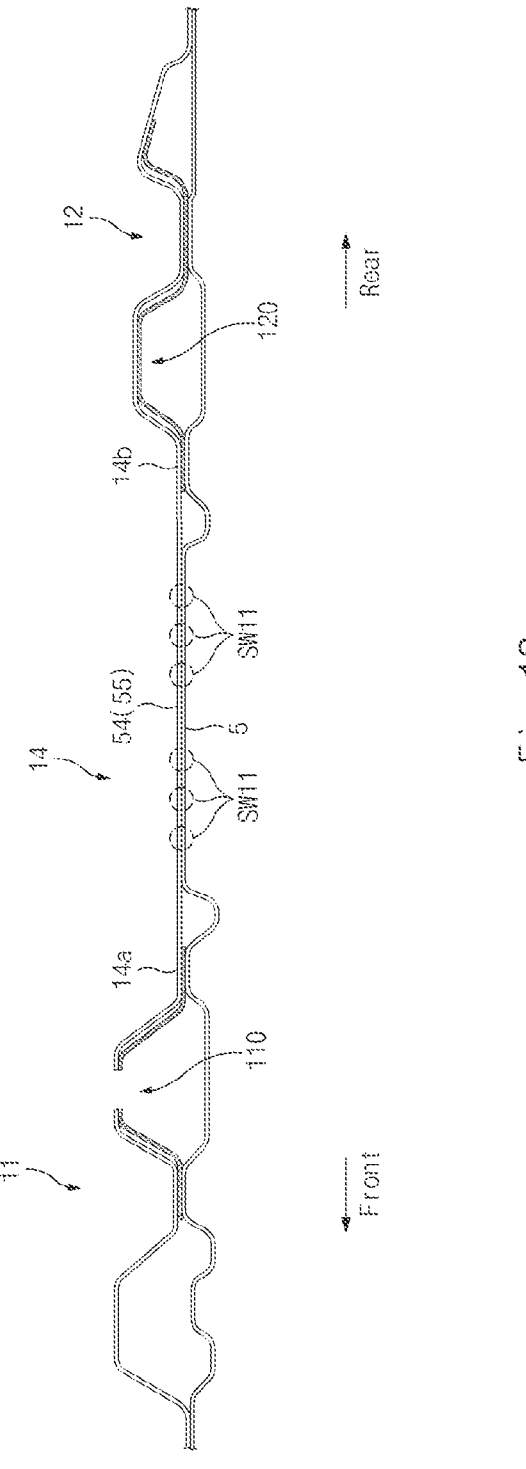
FIG. 12 illustrates a cross-sectional view, taken along line F-F of FIG. 5.

The first flange 54, the second flange 55, and the recessed wall 53 may be recessed from the first top wall 51 and the second top wall 52 toward the floor 5. A recessed depth of the first flange 54 and a recessed depth of the second flange 55 may be greater than a recessed depth of the recessed wall 53. Referring to FIG. 11, the recessed wall 53 may be spaced apart upwardly from the floor 5, and accordingly the recessed wall 53 may not be attached to the floor 5. The first flange 54 and the second flange 55 may be attached to the floor 5 by spot welding SW11 and/or the like.

Referring to FIGS. 4 and 5, each side extension portion 14 may include a front connection portion 14*a* integrally connected to the front cross portion 11 and a rear connection portion 14*b* integrally connected to the rear cross portion 12. The front connection portion 14*a* of the side extension portion 14 may be integrally connected to the second flange 25 of the front cross portion 11, and accordingly connection stiffness between the side extension portion 14 and the front cross portion 11 may be improved. The rear connection portion 14*b* of the side extension portion 14 may be integrally connected to the first flange 34 of the rear cross portion 12, and accordingly connection stiffness between the side extension portion 14 and the rear cross portion 12 may be improved.

Referring to FIGS. 2 and 3, the structural component 10 according to an exemplary embodiment of the present disclosure may further include a pair of edge extension portions 18 located symmetrically with respect to the central extension portion 13 and the pair of side extension portions 14. Each edge extension portion 18 may be configured to integrally connect the corresponding end of the front cross portion 11 and the corresponding end of the rear cross portion 12.

According to an exemplary embodiment, the front cross portion 11, the rear cross portion 12, the central extension portion 13, the pair of side extension portions 14, and the pair of edge extension portions 18 may form a unitary one-piece structure by hot stamping, hot forming, press hardening, and/or the like. That is, the front cross portion 11, the rear cross portion 12, the central extension portion 13, the pair of side extension portions 14, and the pair of edge extension portions 18 may be made of the same material.

Referring to FIG. 4, each edge extension portion 18 may extend along the longitudinal direction of the vehicle to integrally connect the corresponding end of the front cross portion 11 and the corresponding end of the rear cross portion 12. In particular, the edge extension portion 18 may be configured to connect the side flange 16a of the front cross portion 11 and the side flange 17a of the rear cross portion 12. A longitudinal axis of each edge extension portion 18 is perpendicular to the longitudinal axis of the front cross portion 11 and the longitudinal axis of the rear cross portion 12.

Referring to FIGS. 4 and 5, each edge extension portion 18 may include a top wall 18a connecting the side flange 16a of the front cross portion 11 and the side flange 17a of the rear cross portion 12, a connection wall 18b connecting the second tapered wall 28a of the front cross portion 11 and the tapered wall 37a of the rear cross portion 12, and a bottom wall 18c connecting the second end flange 25a of the front cross portion 11 and the end flange 34a of the rear cross portion 12.

The top wall 18a may extend from the side flange 16a and the second end top wall 28 of the front cross portion 11 to the side flange 17a and the end top wall 37 of the rear cross portion 12. The bottom wall 18c may extend from the second end flange 25a of the front cross portion 11 to the end flange 34a of the rear cross portion 12. The connection wall 18b may extend from the second tapered wall 28a of the front cross portion 11 to the tapered wall 37a of the rear cross portion 12. The connection wall 18b may connect the top wall 18a and the bottom wall 18c. The top wall 18a, the connection wall 18b, and the bottom wall 18c of each edge extension portion 18 may be joined to the flange 5a of the floor 5 and the side sill inner 7 using fasteners, welding, and/or the like.

Figure 10:
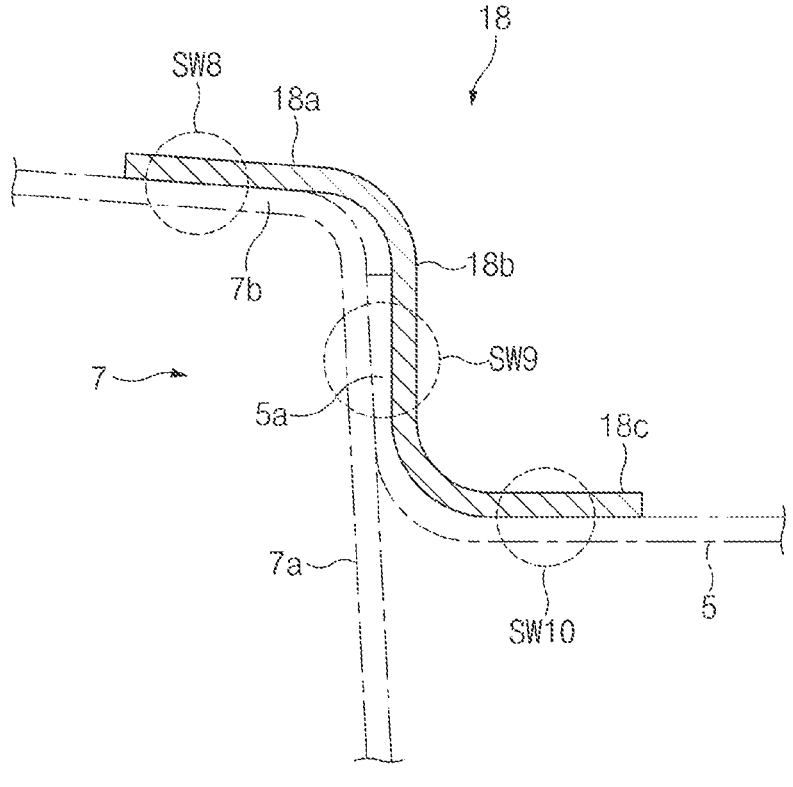
FIG. 10 illustrates a cross-sectional view, taken along line D-D of FIG. 5.

Referring to FIG. 10, the top wall 18a of the edge extension portion 18 may be attached to the top wall 7b of the side sill inner 7 by spot welding SW8 and/or the like, and the bottom wall 18c of the edge extension portion 18 may be attached to the floor 5 by spot welding SW10 and/or the like. The connection wall 18b of the edge extension portion 18 may be attached to the flange 5a of the floor 5 by spot welding SW9 and/or the like. In particular, the connection wall 18b of the edge extension portion 18, the flange 5a of the floor 5, and the inboard side wall 7a of the side sill inner 7 may be at least partially overlapped with each other and be joined.

Each edge extension portion 18 may connect the corresponding end of the front cross portion 11 and the corresponding end of the rear cross portion 12 in the longitudinal direction of the vehicle so that side stiffness of the structural component 10 may be significantly improved. The side flanges 16a and 16b of the front cross portion 11, the side flange 17a of the rear cross portion 12, and the top wall 18a of the edge extension portion 18 may be joined to the top wall 7b of the side sill inner 7 using fasteners, welding, and/or the like so that joint stiffness between the structural component 10 and the side sill inner 7 may be improved. In the event of a side impact/collision of the vehicle, an impact load may be prevented from being concentrated on a portion of the vehicle body and be uniformly distributed in various directions. Each edge extension portion 18 may be joined to the corresponding side sill inner 7, thereby preventing the bending or rotation of the side sill inner 7, and thus a passenger compartment and a battery may be stably protected.

According to an exemplary embodiment, the front cross portion 11, the rear cross portion 12, the central extension portion 13, each side extension portion 14, and each edge extension portion 18 may be made of the same material and have the same thickness, and accordingly the structural component 10 may be precisely formed by hot stamping, hot forming, press hardening, and/or the like.

As described above, the structural component 10 according to an exemplary embodiment of the present disclosure may have a carapace shape through the front cross portion 11, the rear cross portion 12, the central extension portion 13, the pair of side extension portions 14, and the pair of edge extension portions 18. Accordingly, even when the structural component 10 is relatively thin and is made of a steel material, the structural component 10 may have enough stiffness against an impact/collision and reduce its weight. Even when a relatively inexpensive material such as steel instead of an expensive material such as aluminum is used, the weight of the vehicle may be reduced, and the stiffness of the vehicle body may be improved.

Referring to FIGS. 2 and 3, the vehicle body structure according to an exemplary embodiment of the present disclosure may further include a pair of front reinforcements 110 attached to the front cross portion 11. The pair of front reinforcements 110 may be attached symmetrically with respect to a central longitudinal axis of the structural component 10. The pair of front reinforcements 110 may increase the stiffness of the front cross portion 11, thereby satisfying target side crashworthiness of the vehicle. Each front reinforcement 110 may be attached to a rear section of the front cross portion 11 connected to the front connection portion of the side extension portion 14. The front reinforcement 110 may be attached to a bottom surface of the front cross portion 11.

Referring to FIGS. 4 and 5, each front reinforcement 110 may be overlapped with the connection portion between the front cross portion 11 and the corresponding side extension portion 14. Specifically, a portion of the front reinforcement 110 may be overlapped with the front connection portion 14a of the corresponding side extension portion 14. Accordingly, the front reinforcement 110 may increase the stiffness of the front cross portion 11 and the stiffness of the connection portion between the front cross portion 11 and the corresponding side extension portion 14, and thus the overall side crashworthiness of the vehicle body may be improved.

Referring to FIG. 8, the front reinforcement 110 may include a top wall 111, a first flange 112 connected to a front edge of the top wall 111, and a second flange 113 connected to a rear edge of the top wall 111. The first flange 112 may extend along a front edge of the front reinforcement 110, and the second flange 113 may extend along a rear edge of the front reinforcement 110.

The top wall 111, the first flange 112, and the second flange 113 may extend along the longitudinal axis of the front cross portion 11. The top wall 111, the first flange 112, and the second flange 113 may be parallel to each other. The top wall 111 may contact and be joined to a bottom surface of the second top wall 22 of the front cross portion 11. The first flange 112 may contact and be joined to a bottom surface of the recessed wall 23 of the front cross portion 11. The second flange 113 may contact and be joined to a bottom surface of the second flange 25 of the front cross portion 11.

The top wall 11 may face the second top wall 22 of the front cross portion 11, and the front edge of the top wall 11 may be connected to a rear edge of the first flange 112 through a front connection wall 111a. The front connection wall 111a may extend obliquely from the top wall 111 to the first flange 112, and the front connection wall 111a may face the second front connection wall 22a of the front cross portion 11. The first flange 112 may face the recessed wall 23 of the front cross portion 11, and the first flange 112 may be recessed from the top wall 111 toward the floor 5. The rear edge of the top wall 111 may be connected to a front edge of the second flange 113 through a rear connection wall 111b. The rear connection wall 111b may extend obliquely from the top wall 111 to the second flange 113, and the rear connection wall 111b may face the second rear connection wall 22b of the front cross portion 11. The second flange 113 may face the second flange 25 of the front cross portion 11, and the second flange 113 may be recessed from the top wall nil toward the floor 5. The first flange 112 and the second flange 113 may be joined to the floor 5 using fasteners, welding, and/or the like.

Referring to FIG. 8, the first flange 112 may be attached to the bottom surface of the recessed wall 23 of the front cross portion 11 by welding SW1. In particular, the first flange 112 and the recessed wall 23 of the front cross portion 11 may be overlapped and joined to the floor 5 by welding SW1, and the first flange 112 of the front reinforcement 110 may be sandwiched between the recessed wall 23 of the front cross portion 11 and the floor 5. The top wall ill may be attached to the second top wall 22 of the front cross portion 11 by welding SW2. The second flange 113 may be attached to the second flange 25 of the front cross portion 11 by welding SW3. In particular, the second flange 113 of the front reinforcement 110 and the second flange 25 of the front cross portion 11 may be overlapped and joined to the floor 5 by welding SW3, and the second flange 113 of the front reinforcement 110 may be sandwiched between the second flange 25 of the front cross portion 11 and the floor 5.

In addition, the second flange 113 of the front reinforcement 110 may be overlapped and joined to the front connection portion 14a of the side extension portion 14.

The first flange 112, the top wall 11, and the second flange 113 of the front reinforcement 110 may be joined to the front cross portion 11 by welding so that the front reinforcement 110 may be firmly attached to the front cross portion 11, and thus the front reinforcement 110 may improve the stiffness of the front cross portion 11 and the stiffness of the front connection portion 14a of the side extension portion 14.

Referring to FIG. 8, the front connection wall 111a of the front reinforcement 110 may be spaced apart from the second front connection wall 22a of the front cross portion 11 by a predetermined gap t1. For example, the gap t1 may be 2 mm. The rear connection wall 111b of the front reinforcement 110 may be spaced apart from the second rear connection wall 22b of the front cross portion 11 by a predetermined gap t2. For example, the gap t2 may be 2 mm. The front connection wall 111a of the front reinforcement

110 may be spaced apart from the second front connection wall 22a of the front cross portion 11, and the rear connection wall 111b of the front reinforcement no may be spaced apart from the second rear connection wall 22b of the front cross portion 11 so that the first flange 112, the top wall in, and the second flange 113 of the front reinforcement no may stably contact and be joined to the recessed wall 23, the second top wall 22, and the second flange 25 of the front cross portion 11.

Referring to FIGS. 2 and 3, the vehicle body structure according to an exemplary embodiment of the present disclosure may further include a pair of rear reinforcements 120 attached to the rear cross portion 12. The pair of rear reinforcements 120 may be attached symmetrically with respect to the central longitudinal axis of the structural component 10. The pair of rear reinforcements 120 may increase the stiffness of the rear cross portion 12, thereby satisfying target side crashworthiness of the vehicle. Each rear reinforcement 120 may be attached to a front section of the rear cross portion 12 connected to the rear connection portion of the side extension portion 14. The rear reinforcement 120 may be attached to a bottom surface of the rear cross portion 12.

Referring to FIGS. 4 and 5, each rear reinforcement 120 may be overlapped with the connection portion between the rear cross portion 12 and the corresponding side extension portion 14. Specifically, a portion of the rear reinforcement 120 may be overlapped with the rear connection portion 14b of the corresponding side extension portion 14. Accordingly, the rear reinforcement 120 may increase the stiffness of the rear cross portion 12 and the stiffness of the connection portion between the rear cross portion 12 and the corresponding side extension portion 14, and thus the overall side crashworthiness of the vehicle body may be improved.

Referring to FIG. 9, the rear reinforcement 120 may include a first top wall 121, a second top wall 122 spaced apart from the first top wall 121 toward the rear of the vehicle, a recessed wall 123 located between the first top wall 121 and the second top wall 122, and a flange 124 connected to the first top wall 121. The flange 124 may extend along a front edge of the rear reinforcement 120.

The first top wall 121, the second top wall 122, the recessed wall 123, and the flange 124 may extend along the longitudinal axis of the rear cross portion 12. The first top wall 121, the second top wall 122, the recessed wall 123, and the flange 124 may be parallel to each other. The first top wall 121 may contact and be joined to a bottom surface of the first top wall 31 of the rear cross portion 12. The second top wall 122 may contact and be joined to a bottom surface of the second top wall 32 of the rear cross portion 12. The recessed wall 123 may contact and be joined to a bottom surface of the recessed wall 33 of the rear cross portion 12. The flange 124 may contact and be joined to a bottom surface of the first flange 34 of the rear cross portion 12.

Referring to FIG. 9, the first top wall 121 may face the first top wall 31 of the rear cross portion 12, and a front edge of the first top wall 121 may be connected to a rear edge of the flange 124 through a first front connection wall 121a. The first front connection wall 121a may extend obliquely from the first top wall 121 to the flange 124, and the first front connection wall 121a may face the first front connection wall 31a of the rear cross portion 12. A rear edge of the first top wall 121 may be connected to a front edge of the recessed wall 123 through a first rear connection wall 121b. The first rear connection wall 121b may extend obliquely from the first top wall 121 to the recessed wall 123, and the first rear connection wall 121*b* may face the first rear connection wall 31*b* of the rear cross portion 12.

Referring to FIG. 9, the second top wall 122 may face the second top wall 32 of the rear cross portion 12, and the second top wall 122 may extend downwardly and obliquely toward the rear of the vehicle. A front edge of the second top wall 122 may be connected to a rear edge of the recessed wall 123 through a second front connection wall 122*a*. The second front connection wall 122*a* may extend obliquely from the second top wall 122 to the recessed wall 123, and the second front connection wall 122*a* may face the second front connection wall 32*a* of the rear cross portion 12.

Referring to FIG. 9, the recessed wall 123 may face the recessed wall 33 of the rear cross portion 12, and the recessed wall 123 may extend horizontally between a bottom end of the first rear connection wall 121*b* and a bottom end of the second front connection wall 122*a* so that the recessed wall 123 may be recessed from the first top wall 121 and the second top wall 122 toward the floor 5. The flange 124 may be recessed from the first top wall 121 toward the floor 5 through the first front connection wall 121*a*. The flange 124 and the recessed wall 123 may be joined to the floor 5 using fasteners, welding, and/or the like.

Referring to FIG. 9, the flange 124 may be attached to the bottom surface of the first flange 34 of the rear cross portion 12 by welding SW4. The flange 124 and the first flange 34 of the rear cross portion 12 may be overlapped and joined to the floor 5 by welding SW4, and the flange 124 of the rear reinforcement 120 may be sandwiched between the first flange 34 of the rear cross portion 12 and the floor 5. The first top wall 121 may be attached to the first top wall 31 of the rear cross portion 12 by welding SW5. The recessed wall 123 may be attached to the recessed wall 33 of the rear cross portion 12 by welding SW6. The recessed wall 123 and the recessed wall 33 of the rear cross portion 12 may be overlapped and joined to the floor 5 by welding SW6, and the recessed wall 123 of the rear reinforcement 120 may be sandwiched between the recessed wall 33 of the rear cross portion 12 and the floor 5. The second top wall 122 may be overlapped and joined to the second top wall 32 of the rear cross portion 12 by welding SW7.

In addition, the flange 124 of the rear reinforcement 120 may be overlapped and joined to the rear connection portion 14*b* of the side extension portion 14.

The flange 124, the first top wall 121, the recessed wall 123, and the second top wall 122 of the rear reinforcement 120 may be joined to the rear cross portion 12 by welding so that the rear reinforcement 120 may be firmly attached to the rear cross portion 12, and thus the rear reinforcement 120 may improve the stiffness of the rear cross portion 12 and the stiffness of the rear connection portion 14*b* of the side extension portion 14.

Referring to FIG. 9, the first front connection wall 121*a* of the rear reinforcement 120 may be spaced apart from the first front connection wall 31*a* of the rear cross portion 12 by a predetermined gap t3. For example, the gap t3 may be 2 mm. The first rear connection wall 121*b* of the rear reinforcement 120 may be spaced apart from the first rear connection wall 31*b* of the rear cross portion 12 by a predetermined gap t4. For example, the gap t4 may be 2 mm. The second front connection wall 122*a* of the rear reinforcement 120 may be spaced apart from the second front connection wall 32*a* of the rear cross portion 12 by a predetermined gap t5. For example, the gap t5 may be 2 mm. The first front connection wall 121*a* of the rear reinforcement 120 may be spaced apart from the first front connection wall 31*a* of the rear cross portion 12, the first rear connection wall 121*b* of the rear reinforcement 120 may be spaced apart from the first rear connection wall 31*b* of the rear cross portion 12, and the second front connection wall 122*a* of the rear reinforcement 120 may be spaced apart from the second front connection wall 32*a* of the rear cross portion 12 so that the flange 124, the first top wall 121, the recessed wall 123, and the second top wall 122 of the rear reinforcement 120 may stably contact and be joined to the first flange 34, the first top wall 31, the recessed wall 33, and the second top wall 32 of the rear cross portion 12.

According to an exemplary embodiment, the cross-section of the front cross portion 11 and the cross-section of the rear cross portion 12 may be different from each other by considering the mounting of the vehicle seats, the implementation of a flat floor system, and the like. The cross-section of the front reinforcement 110 may match a portion of the cross-section of the front cross portion 11, and the cross-section of the rear reinforcement 120 may match a portion of the cross-section of the rear cross portion 12.

According to another exemplary embodiment, the front cross portion 11 and the rear cross portion 12 may have the same or similar cross-sectional shape. The cross-section of the front reinforcement 110 may match a portion of the cross-section of the front cross portion 11, and the cross-section of the rear reinforcement 120 may match a portion of the cross-section of the rear cross portion 12.

Figure 14:
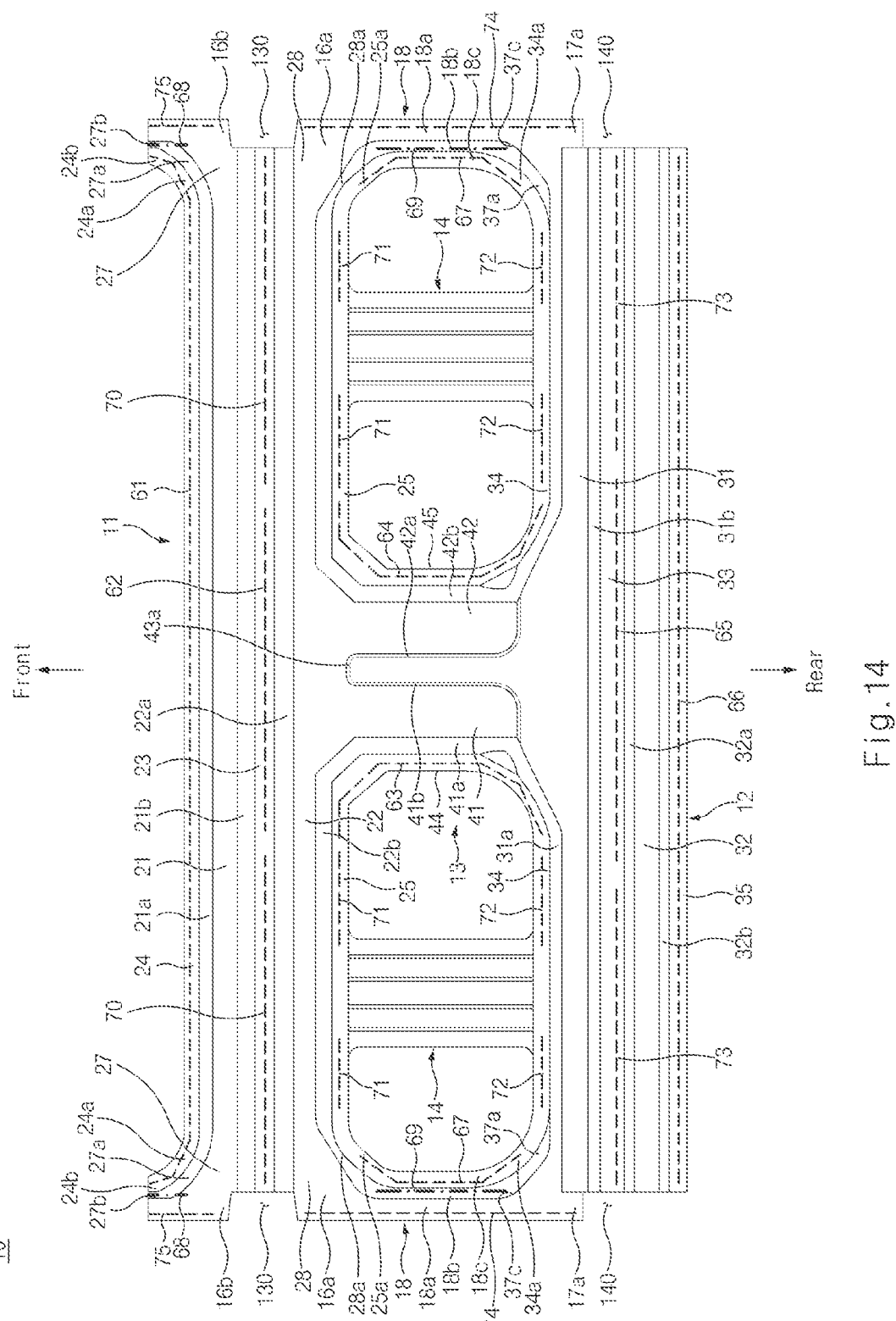
FIG. 14 illustrates a plan view of a plurality of welding lines on a vehicle body structure according to an exemplary embodiment of the present disclosure.

The first flange 24, the pair of first end flanges 24*a*, and the pair of straight flanges 24*b* of the front cross portion 11 may be joined to the floor 5 through a first welding line 61. Referring to FIG. 14, a plurality of welding points may be arranged at a predetermined pitch so that the first welding line 61 may extend along the first flange 24, the pair of first end flanges 24*a*, and the pair of straight flanges 24*b* of the front cross portion 11.

A middle section of the recessed wall 23 of the front cross portion 11 may be joined to the floor 5 through a second welding line 62. Referring to FIG. 14, a plurality of welding points may be arranged at a predetermined pitch so that the second welding line 62 may extend along the middle section of the recessed wall 23 of the front cross portion 11.

A portion of the second flange 25 of the front cross portion 11, the first flange 44 of the central extension portion 13, and a portion of the first flange 34 of the rear cross portion 12 may be joined to the floor 5 through a third welding line 63. Referring to FIG. 14, a plurality of welding points may be arranged at a predetermined pitch so that the third welding line 63 may extend along the portion of the second flange 25 of the front cross portion 11, the first flange 44 of the central extension portion 13, and the portion of the first flange 34 of the rear cross portion 12.

A portion of the second flange 25 of the front cross portion 11, the second flange 45 of the central extension portion 13, and a portion of the first flange 34 of the rear cross portion 12 may be joined to the floor 5 through a fourth welding line 64. Referring to FIG. 14, a plurality of welding points may be arranged at a predetermined pitch so that the fourth welding line 64 may extend along the portion of the second flange 25 of the front cross portion 11, the second flange 45 of the central extension portion 13, and the portion of the first flange 34 of the rear cross portion 12.

A middle section of the recessed wall 33 of the rear cross portion 12 may be joined to the floor 5 through a fifth welding line 65. Referring to FIG. 14, a plurality of welding points may be arranged at a predetermined pitch so that the fifth welding line 65 may extend along the middle section of the recessed wall 33 of the rear cross portion 12.

The second flange 35 of the rear cross portion 12 may be joined to the floor 5 through a sixth welding line 66. Referring to FIG. 14, a plurality of welding points may be arranged at a predetermined pitch so that the sixth welding line 66 may extend along the second flange 35 of the rear cross portion 12.

The second end flange 25a of the front cross portion 11, the bottom wall 18c of the edge extension portion 18, and the end flange 34a of the rear cross portion 12 may be joined to the floor 5 through a seventh welding line 67. Referring to FIG. 14, a plurality of welding points may be arranged at a predetermined pitch so that the seventh welding line 67 may extend along the second end flange 25a of the front cross portion 11, the bottom wall 18c of the edge extension portion 18, and the end flange 34a of the rear cross portion 12.

The straight extension wall 27b of the front cross portion 11 may be joined to the side sill inner 7 through an eighth welding line 68. In particular, the straight extension wall 27b of the front cross portion 11 may be overlapped and joined to the side sill inner 7 and the flange 5a of the floor 5 through the eighth welding line 68. Referring to FIG. 14, a plurality of welding points may be arranged at a predetermined pitch so that the eighth welding line 68 may extend along the straight extension wall 27b of the front cross portion 11.

The connection wall 18b of the edge extension portion 18 may be joined to the inboard side wall 7a of the side sill inner 7 and the flange 5a of the floor 5 through a ninth welding line 69. Referring to FIG. 14, a plurality of welding points may be arranged at a predetermined pitch so that the ninth welding line 69 may extend along the connection wall 18b of the edge extension portion 18.

A portion of the recessed wall 23 of the front cross portion 11 and the first flange 112 of the front reinforcement 110 may be joined to the floor 5 through a tenth welding line 70. Referring to FIG. 14, a plurality of welding points may be arranged at a predetermined pitch so that the tenth welding line 70 may extend along the portion of the recessed wall 23 of the front cross portion 11.

A portion of the second flange 25 of the front cross portion 11 and the second flange 113 of the front reinforcement 110 may be joined to the floor 5 through an eleventh welding line 71. Referring to FIG. 14, a plurality of welding points may be arranged at a predetermined pitch so that the eleventh welding line 71 may extend along the portion of the second flange 25 of the front cross portion 11.

A portion of the first flange 34 of the rear cross portion 12 and the flange 124 of the rear reinforcement 120 may be joined to the floor 5 through a twelfth welding line 72. Referring to FIG. 14, a plurality of welding points may be arranged at a predetermined pitch so that the twelfth welding line 72 may extend along the portion of the first flange 34 of the rear cross portion 12.

A portion of the recessed wall 33 of the rear cross portion 12 and the recessed wall 123 of the rear reinforcement 120 may be joined to the floor 5 through a thirteenth welding line 73. Referring to FIG. 14, a plurality of welding points may be arranged at a predetermined pitch so that the thirteenth welding line 73 may extend along the portion of the recessed wall 33 of the rear cross portion 12.

The side flange 16a of the front cross portion 11, the top wall 18a of the edge extension portion 18, and the side flange 17a of the rear cross portion 12 may be joined to the side sill inner 7 and the projection portion 9a of the side sill reinforcement 9 mounted in the side sill inner 7 through a fourteenth welding line 74. Referring to FIG. 14, a plurality of welding points may be arranged at a predetermined pitch so that the fourteenth welding line 74 may extend along the side flange 16a of the front cross portion 11, the top wall 18a of the edge extension portion 18, and the side flange 17a of the rear cross portion 12.

The sub-side flange 16b of the front cross portion 11 may be joined to the side sill inner 7 and the projection portion 9a of the side sill reinforcement 9 mounted in the side sill inner 7 through a fifteenth welding line 75. Referring to FIG. 14, a plurality of welding points may be arranged at a predetermined pitch so that the fifteenth welding line 75 may extend along the sub-side flange 16b of the front cross portion 11.

According to an exemplary embodiment, the strength of the structural component 10 may be greater than or equal to the strength of the front reinforcement 110 and the strength of the rear reinforcement 120. The material and thickness of the structural component 10, the material and thickness of the front reinforcement 11o, and the material and thickness of the rear reinforcement 120 may be determined in various manners depending on types of vehicles, various mounting conditions, and the like.

Referring to FIG. 2, two front outer seat brackets 2 may be individually mounted on both end portions of the front cross portion 11 using fasteners, welding, and/or the like, and two front inner seat brackets 4 may be individually mounted on the front cross portion 11 using fasteners, welding, and/or the like. Front seats (not shown) may be mounted on the front cross portion 11 through the front inner seat brackets 4 and the front outer seat brackets 2.

Figure 16:
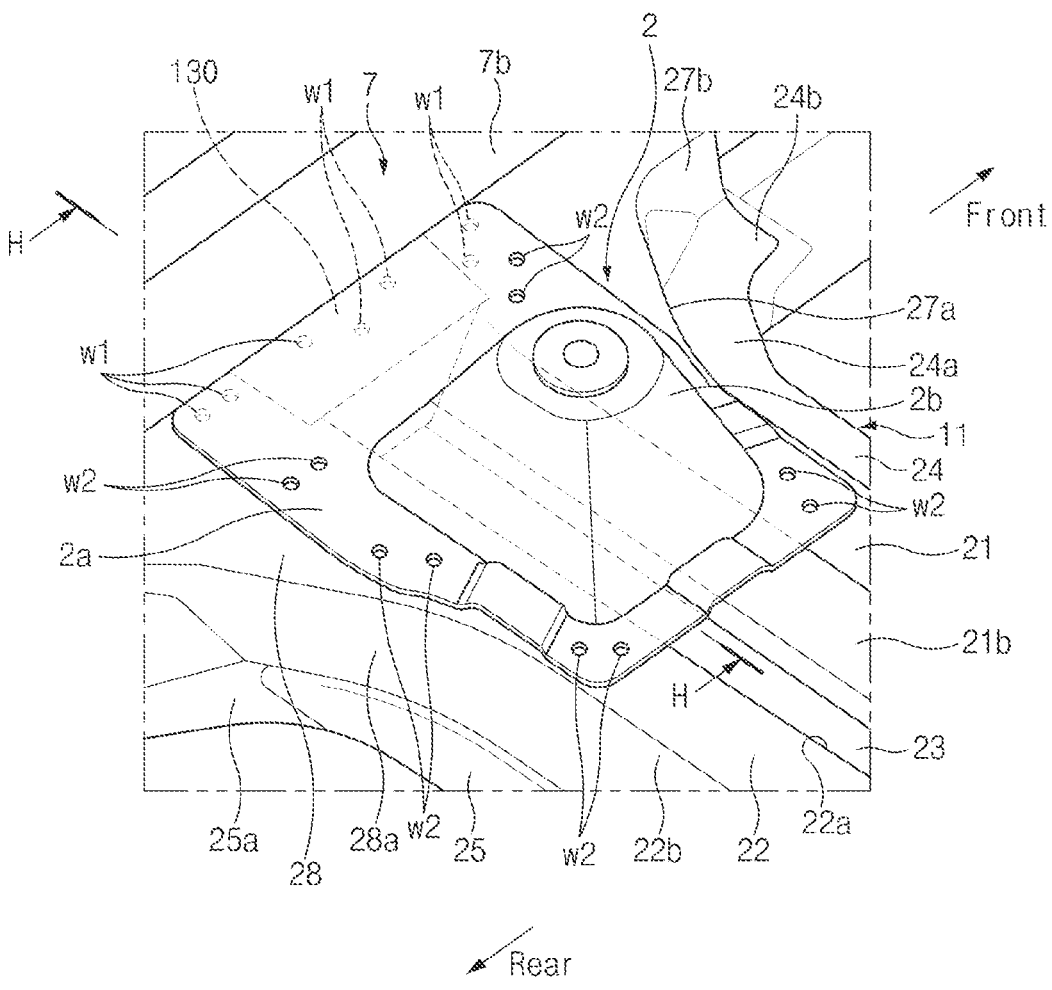
FIG. 16 illustrates a state in which the front cut-out portion illustrated in FIG. 15 is covered with a front outer seat bracket.

Referring to FIG. 16, each front outer seat bracket 2 may cover the front cut-out portion 130 of the front cross portion 11. Accordingly, the front cut-out portion 130 of the front cross portion 11 may be prevented from being exposed to the outside, and thus exterior styling of the vehicle body structure may be improved. Each front outer seat bracket 2 may include a flange 2a and a mounting portion 2b raised from the flange 2a. An outboard-side portion of the flange 2a may be joined to the side flange 16a and the sub-side flange 16b of the front cross portion 11 and the top wall 7b of the side sill inner 7 through a plurality of welding points w1. An inboard-side portion of the flange 2a may be joined to the end portion of the front cross portion 11 through a plurality of welding points w2.

Referring to FIG. 17, the outboard-side portion of the flange 2a may be overlapped and joined to the top wall 7b of the side sill inner 7 and the projection portion 9a of the side sill reinforcement 9 through the plurality of welding points w1. The recessed wall 23 of the front cross portion 11, the first flange 112 of the front reinforcement 110, and the floor 5 may be triple-overlapped and joined by welding SW1.

As the front cross portion 11 has the uniform cross-section throughout its entire length, and the front cut-out portion 130 is defined between the end of the front cross portion 11, the side flange 16a, and the sub-side flange 16b, each end of the front cross portion 11 may contact or be close to the flange 5a of the floor 5 and the side sill inner 7 of the side sill 6. As illustrated in FIG. 17, a portion of the recessed wall 23 of the front cross portion 11 together with the first flange 112 of the front reinforcement 110 may be joined to the floor 5. Thus, the triple joint of the front cross portion 11, the front reinforcement 11o, and the floor 5 may improve the side crashworthiness of the vehicle.

Referring to FIG. 2, two rear outer seat brackets 3 may be individually mounted on both end portions of the rear cross portion 12 using fasteners, welding, and/or the like, and two rear inner seat brackets 8 may be individually mounted on the rear cross portion 12 using fasteners, welding, and/or the like. Rear seats (not shown) may be mounted on the rear cross portion 12 through the rear inner seat brackets 8 and the rear outer seat brackets 3.

Figure 19:
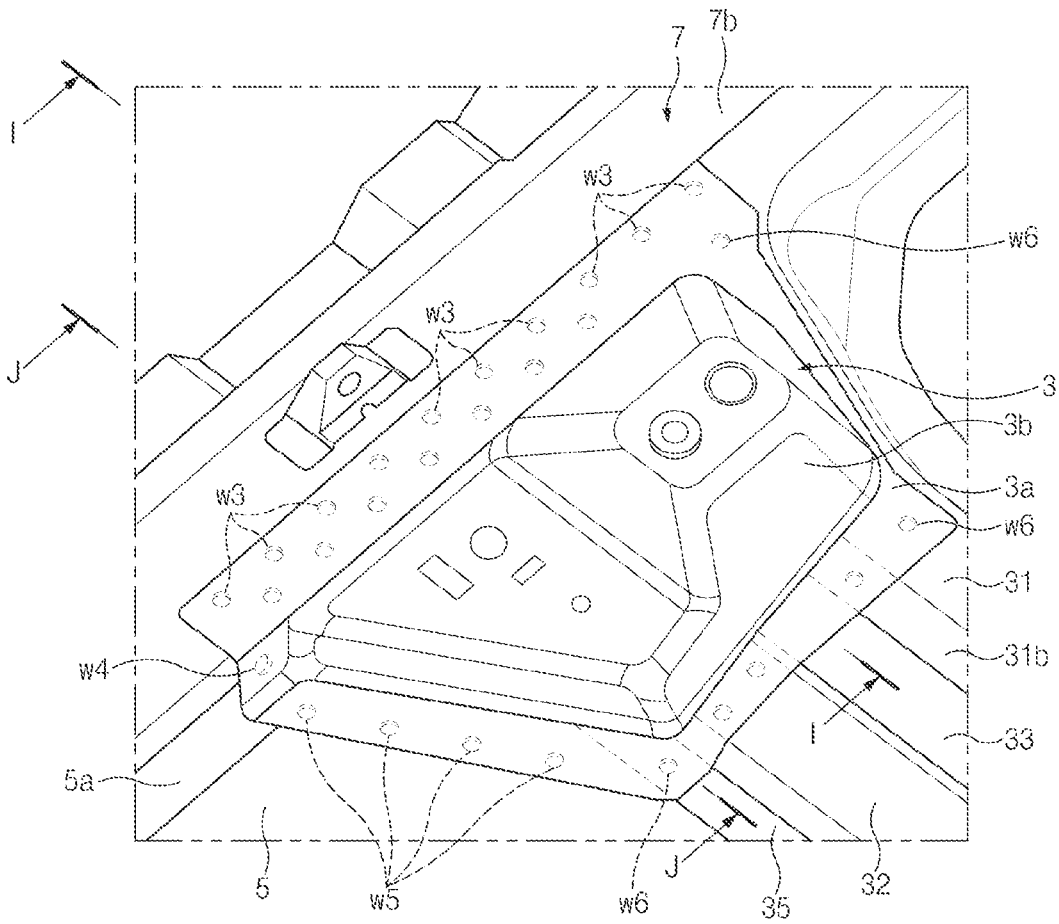
FIG. 19 illustrates a state in which the rear cut-out portion illustrated in FIG. 18 is covered with a rear outer seat bracket.

Referring to FIG. 19, each rear outer seat bracket 3 may cover the rear cut-out portion 140 of the rear cross portion 12. Accordingly, the rear cut-out portion 140 of the rear cross portion 12 may be prevented from being exposed to the outside, and thus exterior styling of the vehicle body structure may be improved. Each rear outer seat bracket 3 may include a flange 3a and a mounting portion 3b raised from the flange 3a. The flange 3a may have a shape covering the side sill inner 7, the end portion of the rear cross portion 12, the floor 5, and the flange 5a of the floor 5. A first section of an outboard-side portion of the flange 3a may be joined to a portion of the side flange 17a of the rear cross portion 12 and the top wall 7b of the side sill inner 7 through a plurality of welding points w3. A second section of the outboard-side portion of the flange 3a may be joined to the inboard side wall 7a of the side sill inner 7 and the flange 5a of the floor 5 through a welding point w4. A first section of an inboard-side portion of the flange 3a may be joined to the floor 5 through a plurality of welding points w5. A second section of the inboard-side portion of the flange 3a may be joined to the end portion of the rear cross portion 12 through a plurality of welding points w6.

Referring to FIG. 20, the outboard-side portion of the flange 3a may be overlapped and joined to the top wall 7b of the side sill inner 7 and the projection portion 9a of the side sill reinforcement 9 through the plurality of welding points w3. The recessed wall 33 of the rear cross portion 12, the recessed wall 123 of the rear reinforcement 120, and the floor 5 may be triple-overlapped and joined by welding SW6. As the rear outer seat bracket 3 is located above a section AD1 of the rear reinforcement 120, the section AD1 of the rear reinforcement 120 may not be attached to the floor 5 by welding. Accordingly, the recessed wall 123 corresponding to the section AD1 of the rear reinforcement 120 located below the rear outer seat bracket 3 may be attached to the floor 5 using an adhesive layer 78.

Referring to FIG. 21, the second flange 35 of the rear cross portion 12 may be joined to the floor 5 through a plurality of welding points w8. As the rear outer seat bracket 3 is located above a section AD2 of the rear cross portion 12, the section AD2 of the rear cross portion 12 may not be attached to the floor 5 by welding. Accordingly, the second flange 35 corresponding to the section AD2 of the rear cross portion 12 located below the rear outer seat bracket 3 may be attached to the floor 5 using the adhesive layer 78.

As the rear cross portion 12 has the uniform cross-section throughout its entire length, and the rear cut-out portion 140 is defined between the end of the rear cross portion 12 and the side flange 17a, each end of the rear cross portion 12 may contact or be close to the flange 5a of the floor 5 and the side sill inner 7 of the side sill 6. As illustrated in FIG. 20, a portion of the recessed wall 33 of the rear cross portion 12 together with the recessed wall 123 of the rear reinforcement 120 may be joined to the floor 5, and as illustrated in FIG. 21, the second flange 35 of the rear cross portion 12 may be joined to the floor. Thus, the triple joint of the rear cross portion 12, the rear reinforcement 120, and the floor 5 using welding, the adhesive layer, and/or the like may improve the side crashworthiness of the vehicle.

After the pair of front reinforcements 110 and the pair of rear reinforcements 120 are attached to the bottom surfaces of the front and rear cross portions 11 and 12 of the structural component 10, the two front outer seat brackets 2, the two front inner seat brackets 4, the two rear outer seat brackets

3, and the two rear inner seat brackets 8 may be mounted on the structural component 10. The structural component 10 may be mounted on the floor 5 and the pair of side sills 6.

As set forth above, the structural component according to exemplary embodiments of the present disclosure may have a carapace shape through the front cross portion, the rear cross portion, the central extension portion, the pair of side extension portions, and the pair of edge extension portions. Accordingly, even if the structural component is relatively thin and is made of a steel material, the structural component may have enough stiffness against an impact/collision and reduce its weight. Even if a relatively inexpensive material such as steel instead of an expensive material such as aluminum is used, the weight of the vehicle may be reduced, and the stiffness of the vehicle body may be improved.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vehicle body comprising:
a front cross portion having a substantially uniform cross-section throughout its entire length;
a rear cross portion spaced apart from the front cross portion, the rear cross portion having a substantially uniform cross-section throughout its entire length;
a connection structure connecting the front cross portion and the rear cross portion; and
a pair of front reinforcements attached to the front cross portion,
wherein:
the front cross portion has a recessed wall extending along a longitudinal axis thereof, and
each front reinforcement is attached to the recessed wall of the front cross portion.

2. The vehicle body according to claim 1, further comprising:
a pair of rear reinforcements attached to the rear cross portion.

3. The vehicle body according to claim 2, wherein:
the rear cross portion has a recessed wall extending along a longitudinal axis thereof, and
each rear reinforcement is attached to the recessed wall of the rear cross portion.

4. The vehicle body according to claim 2, wherein the connection structure comprises:
a central extension portion connecting a central portion of the front cross portion and a central portion of the rear cross portion; and
a pair of side extension portions located symmetrically with respect to the central extension portion.

5. The vehicle body according to claim 4, wherein:
each side extension portion comprises a front connection portion connected to the front cross portion, and
a portion of each front reinforcement is overlapped with the front connection portion of the side extension portion.

6. The vehicle body according to claim 4, wherein:
each side extension portion comprises a rear connection portion connected to the rear cross portion, and
a portion of each rear reinforcement is overlapped with the rear connection portion of the side extension portion.

7. The vehicle body according to claim 1, further comprising a pair of side flanges connected to both ends of the front cross portion, respectively, wherein a longitudinal axis of each side flange is perpendicular to a longitudinal axis of the front cross portion.

8. The vehicle body according to claim 1, further comprising a pair of side flanges connected to both ends of the rear cross portion, respectively, wherein a longitudinal axis of each side flange is perpendicular to a longitudinal axis of the rear cross portion.

9. The vehicle body according to claim 1, further comprising:
a pair of front outer seat brackets mounted on both end portions of the front cross portion, respectively; and
a pair of rear outer seat brackets mounted on both end portions of the rear cross portion, respectively.

10. The vehicle body according to claim 1, further comprising a pair of edge extension portions connecting both ends of the front cross portion and both ends of the rear cross portion, respectively, wherein a longitudinal axis of each edge extension portion is perpendicular to a longitudinal axis of the front cross portion and a longitudinal axis of the rear cross portion.

11. A vehicle body comprising:
a floor comprising a pair of flanges opposing each other;
a pair of side sill inners joined to the pair of flanges, respectively; and
a structural component joined to the floor and the pair of side sill inners, wherein the structural component comprises:
a front cross portion having a substantially uniform cross-section throughout its entire length;
a rear cross portion spaced apart from the front cross portion, the rear cross portion having a substantially uniform cross-section throughout its entire length;
a central extension portion and a pair of side extension portions connecting the front cross portion and the rear cross portion, wherein the pair of side extension portions are located symmetrically with respect to the central extension portion; and
a pair of rear reinforcements attached to the rear cross portion,
wherein:
the rear cross portion has a recessed wall extending along a longitudinal axis thereof, and
each rear reinforcement is attached to the recessed wall of the rear cross portion.

12. The vehicle body according to claim 11, further comprising:
a pair of front reinforcements attached to the front cross portion.

13. The vehicle body according to claim 12, wherein:
the front cross portion has a recessed wall extending along a longitudinal axis thereof, and each front reinforcement is attached to the recessed wall of the front cross portion and the floor.

14. The vehicle body according to claim 11, wherein the structural component further comprises:
a pair of side flanges connected to both ends of the front cross portion, respectively, wherein each side flange is joined to a corresponding side sill inner; and
a pair of front cut-out portions provided at both ends of the front cross portion, respectively, wherein each front cut-out portion is defined by a corresponding end of the front cross portion and a corresponding side flange.

15. The vehicle body according to claim 14, further comprising a pair of front outer seat brackets covering the pair of front cut-out portions, respectively.

16. The vehicle body according to claim 15, wherein:
an outboard-side portion of each front outer seat bracket is joined to the side flange and a top wall of the side sill inner, and
an inboard-side portion of the front outer seat bracket is joined to an end portion of the front cross portion.

17. The vehicle body according to claim 11, wherein the structural component further comprises:
a pair of side flanges connected to both ends of the rear cross portion, respectively, wherein each side flange is joined to a corresponding side sill inner; and
a pair of rear cut-out portions provided at both ends of the rear cross portion, respectively, wherein each rear cut-out portion is defined by a corresponding end of the rear cross portion and a corresponding side flange.

18. The vehicle body according to claim 17, further comprising a pair of rear outer seat brackets covering the pair of rear cut-out portions, respectively.

19. The vehicle body according to claim 18, wherein:
a first section of an outboard-side portion of each rear outer seat bracket is joined to the side flange and a top wall of the side sill inner,
a second section of the outboard-side portion of the rear outer seat bracket is joined to an inboard side wall of the side sill inner and a corresponding flange of the floor,
a first section of an inboard-side portion of the rear outer seat bracket is joined to the floor, and
a second section of the inboard-side portion of the rear outer seat bracket is joined to an end portion of the rear cross portion.

20. The vehicle body according to claim 11, wherein the structural component further comprises a pair of edge extension portions connecting both ends of the front cross portion and both ends of the rear cross portion, respectively, wherein each edge extension portion is overlapped and joined to a corresponding side sill inner and a corresponding flange of the floor.

* * * * *